United States Patent [19]

Kadonoff et al.

[11] Patent Number: 4,829,442
[45] Date of Patent: May 9, 1989

[54] BEACON NAVIGATION SYSTEM AND METHOD FOR GUIDING A VEHICLE

[75] Inventors: Mark B. Kadonoff, Somerville; James F. Maddox, Arlington, both of Mass.; Robert W. George, II, Windham, N.H.; Faycal E. Benayad-Cherif, Somerville, Mass.

[73] Assignee: Denning Mobile Robotics, Inc., Wilmington, Mass.

[21] Appl. No.: 864,442

[22] Filed: May 16, 1986

[51] Int. Cl.⁴ ......................... G06F 15/50; B62D 1/02
[52] U.S. Cl. ..................................... 364/449; 180/169; 364/424.02; 364/513
[58] Field of Search ............... 364/443, 424, 449, 513; 180/167, 168, 169, 211, 212

[56] References Cited

U.S. PATENT DOCUMENTS

| | | | |
|---|---|---|---|
| 4,049,961 | 9/1977 | Marcy | 180/169 X |
| 4,119,900 | 10/1978 | Kremnitz | 364/424 |
| 4,309,758 | 1/1982 | Halsall et al. | 364/424 |
| 4,328,545 | 5/1982 | Halsall et al. | 364/424 |
| 4,463,821 | 8/1984 | Falamak | 180/168 |
| 4,500,970 | 2/1985 | Daemmer | 364/513 |
| 4,556,940 | 12/1985 | Katoo et al. | 364/424 |
| 4,573,548 | 3/1986 | Holland | 180/211 |
| 4,593,238 | 6/1986 | Yamamoto | 180/167 |
| 4,620,285 | 10/1986 | Perdue | 364/424 X |
| 4,626,995 | 12/1986 | Lofgren et al. | 364/424 |
| 4,638,445 | 1/1987 | Mattaboni | 364/513 |
| 4,641,251 | 2/1987 | Inoue | 364/513 |
| 4,653,002 | 3/1987 | Barry | 364/424 |
| 4,658,385 | 4/1987 | Tsuji | 180/169 |

FOREIGN PATENT DOCUMENTS

60-63698 4/1985 Japan .

OTHER PUBLICATIONS

Kajiwara et al: Development of a Mobile Robot for Security Guards, Sogo Keibi Hoshou Co., pp. 271-278.
Moravec et al: Towards Autonomous Vehicles, The Mobile Robot Laboratory Staff-Report 1984 Annual Research Robotics Institute, Carnegie Mellon University, pp. 33-49 (1985).

Primary Examiner—Felix D. Gruber
Attorney, Agent, or Firm—Joseph S. Iandiorio; Douglas E. Denninger

[57] ABSTRACT

A beacon navigation system for a vehicle including a plurality of navigation beacons distributed about a premises through which the vehicle is to navigate, and a detector assembly for sensing a beacon and for resolving the azimuthal angle between the beacon and the vehicle. The system further includes an element for defining an optimum azimuthal angle between that beacon and the vehicle, and a device for determining the difference between the resolved angle and the optimum angle to represent the deviation of the vehicle from a designated path. A method of establishing navigational paths among navigation nodes proximate beacons is also disclosed.

19 Claims, 36 Drawing Sheets

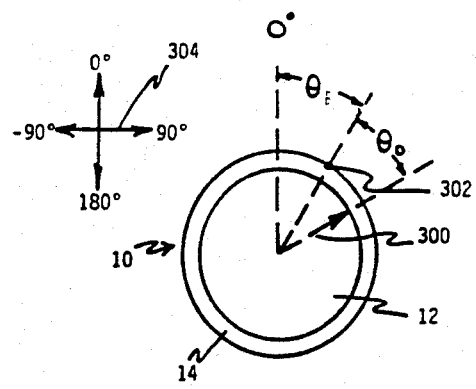
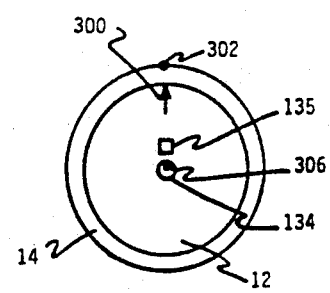
FIG. 4A    FIG. 4B
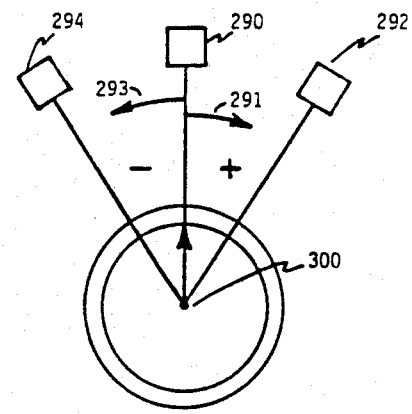
FIG. 4C

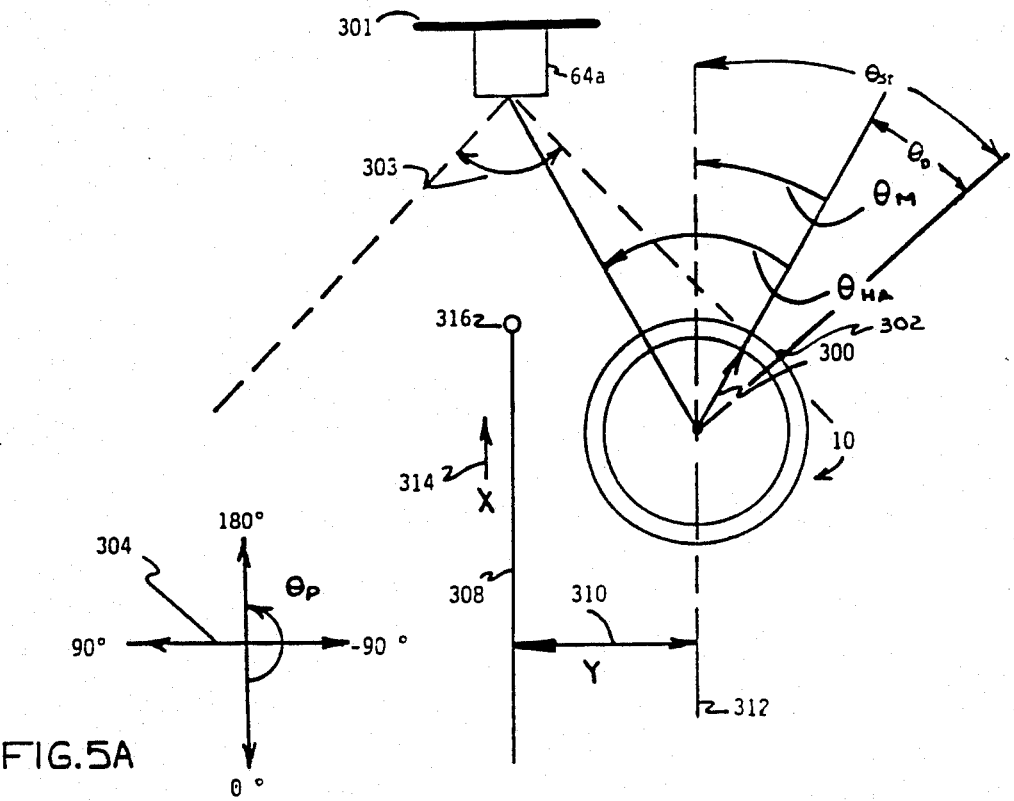
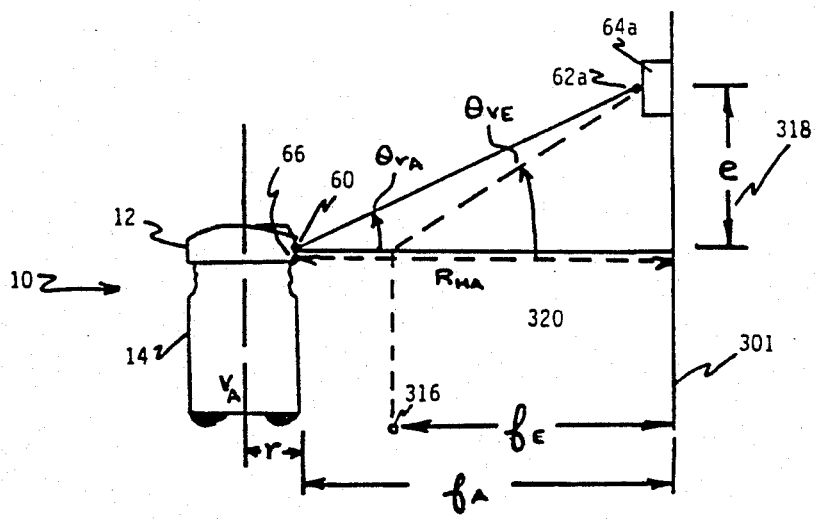
FIG. 5A
FIG. 5B

ARBITER - NAVIGATION

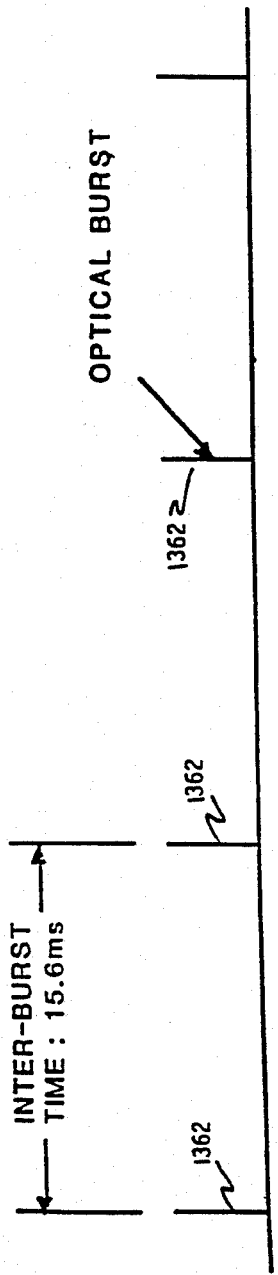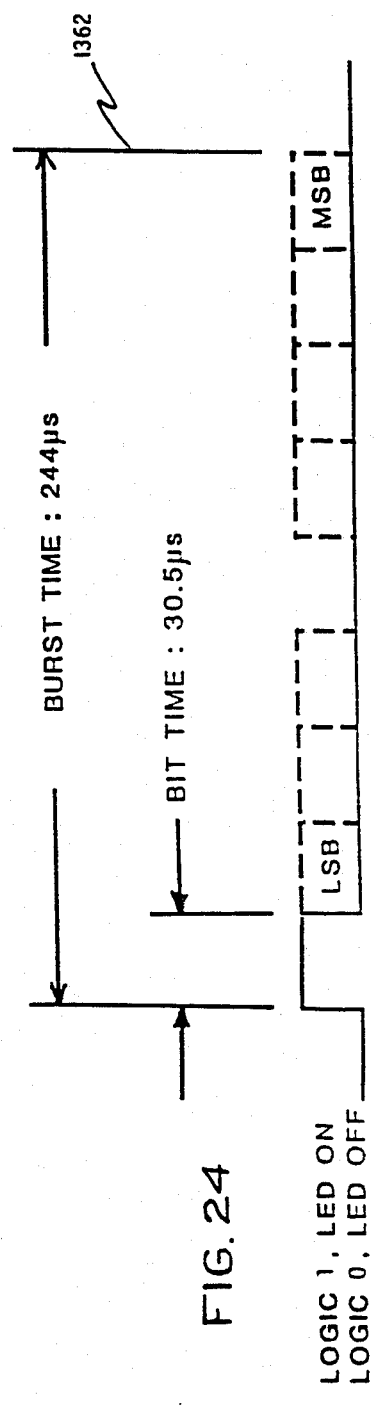
FIG. 23
FIG. 24

BEACON NAVIGATION SYSTEM AND METHOD FOR GUIDING A VEHICLE

FIELD OF INVENTION

This invention relates to a system and method for navigating a vehicle such as a mobile robot among navigation beacons, and more particularly to such a system and method which permit the vehicle to define a path in reference to a single

CROSS-REFERENCES

The following applications, filed concurrently herewith, are incorporated herein by reference:

| Inventors | Title | Serial No |
|---|---|---|
| Maddox et al. | Intrusion Detection System | 864,032 |
| Muller et al. | Ultrasonic Ranging System | 864,002 |
| Benayad-Cherif et al. | Position Locating System for Vehicle | 864,031 |
| Pavlak et al. | Power-Up Sequencing Apparatus | 864,590 |
| Maddox et al. | Beacon Proximity Detection System for Vehicle | 864,292 |
| Kadonoff et al. | Orientation Adjustment System and Robot Using Same | 864,450 |
| Kadonoff et al. | Obstacle Avoidance System | 864,585 |
| George II et al. | Recharge Docking System for Mobile Robot | 864,028 |

BACKGROUND OF INVENTION

Navigating a vehicle through its environment poses a number of problems, particularly for autonomous robots. Presently there are a number of navigation systems which rigidly define paths the robot must follow.

One system utilizes a cable, tape or other track which is laid across the ground. The robot must follow that track and cannot deviate from it. This presents problems when obstacles appear across the path.

Another system uses spot markers such as glass bubbles which are placed along the floor along a path. The bubbles are highly reflective and reflect incident light which is tracked by the robot.

Yet other systems follow laser beams or spotlight a target with infrared radiation or a laser beam. The robots then head toward that target.

Some robots utilize inertial reference systems to guide them among compass headings. Inertial reference is typically provided by a gyroscope. Accurate gyroscopes, particularly digitally readable ones, are quite expensive and are relatively delicate.

Navigation can also be accomplished by dead reckoning. Encoders on the drive system record the distance travelled by the wheels or tracks of the robot. This technique, also known as odometry, further includes steering encoders to record changes in orientation.

Other systems model the surrounding environment by reducing the environment to geometric features. The environment is typically modelled as a series of line segments representing surface features, or as a grid representing the probability of presence or absence of objects within particular locations. Paths such as S-curves are then plotted around the modelled features.

SUMMARY OF INVENTION

This invention features a beacon navigation system and method which readily guide a vehicle such as a robot about a premises.

It is a further object of this invention to provide such a system and method which are relatively simple to implement.

It is a further object of this invention to provide such a system and method which permit the vehicle to deviate from a desired path.

It is a further object of this invention to provide such a system and method which are inexpensive.

It is a further object of this invention to provide such a beacon navigation system which is easily reconfigurable.

A still further object of this invention is to provide such a system and method which can identify a unique destination.

Another object of this invention is to provide such a system and method which can establish a path utilizing a single beacon.

Yet another object of this invention is to provide such a system and method that can accommodate a beacon which is offset from a desired path.

The invention results from the realization that a truly effective navigation system can be achieved by distributing one or more beacons about a premises to be patrolled by a robot, sensing a beacon and resolving its azimuthal angle to the robot, defining an optimum azimuthal angle between that beacon and the robot, and detecting deviation of the robot from the path by determining the difference between the resolved angle and the optimum angle.

This invention features a beacon navigation system for a vehicle. There are a plurality of navigation beacons distributed about a premises through which the vehicle is to navigate, and detector means for sensing a beacon and for resolving the azimuthal angle between the beacon and the vehicle. There are also means for defining an optimum azimuthal angle between that beacon and the vehicle and means for determining the difference between the resolved angle and the optimum angle to represent the deviation of the vehicle from a designated path.

In one embodiment, the detector means includes means for identifying the azimuthal angle between the beacon and the direction of travel of the vehicle. The means for defining includes means for providing a known offset of the beacon from the designated path, and the means for defining produces the optimum angle as a function of the offset. The means for providing includes means for generating an azimuthal offset angle of the beacon from the path as a function of the known azimuthal distance of the beacon from the path and the difference between the expected path distance and the actual distance travelled by the vehicle along the path. The means for determining includes means for combining the resolved angle and the offset angle to represent the angular deviation of the vehicle from the path.

In another embodiment, the means for defining further includes means for supplying the expected path distance and the known azimuthal distance. The means for supplying includes memory means for storing the expected path distance and the known azimuthal distance. The means for defining may further include means for measuring the actual distance travelled by the vehicle along the axis of the path. The navigation system further includes means, responsive to the means for combining, for turning the vehicle by the angular deviation produced by the means for combining.

Each beacon may include means for emitting detectable energy. The detector means includes a multi-sector sensor for sensing a signal emitted by the beacon and means responsive to the sensor sectors for generating an angle data signal representative of the angle from the sensor to the reference in at least the azimuthal dimension. The sensor may be a lateral effect photodiode and the detector means may further include means, responsive to the generated azimuthal angle, for calculating the direction from the sensor to the beacon. In yet another embodiment, the detector means includes a multi-sector sensor for sensing a signal emitted by the beacon, and means for generating a code data signal representative of the coded signal. The detector means further includes means responsive to the sensor sectors for generating an angle data signal representative of the angle from the sensor to the beacon in at least the azimuthal dimension.

This invention further features a beacon navigation system for a vehicle utilizing one or more navigation beacons distributed about a premises through which the vehicle is to navigate, including detector means for sensing a beacon and for resolving the azimuthal angle between the beacon and the vehicle. There is also means for determining the difference between the resolved angle and the optimum angle to represent the deviation of the vehicle from a designated path. The means for defining may include means for supplying the expected path distance and the known azimuthal distance of the beacon from the path, means for measuring the actual distance travelled by the vehicle along the path, and means for generating an azimuthal offset angle of the beacon from the path as a function of the known azimuthal distance and the difference between the expected path distance and the actual distance travelled. The means for determining may include means for combining the resolved angle and the offset angle to represent the angular deviation of the vehicle from the path, and the system may further include means for turning the vehicle by the angular deviation.

This invention may also be expressed as a method of establishing navigational paths for a vehicle among navigation nodes proximate navigation beacons. The method includes directing the vehicle to a position to be designated as a navigation node, designating that position as a first node, placing a beacon at a second node to be designated, instructing the vehicle to search for and head toward the beacon, halting the vehicle at the second node, and commanding the vehicle to record information defining the second node.

In one embodiment the method includes commanding the vehicle to record the azimuthal distance of the beacon from the path and the path distance to the second node. The vehicle may be commanded to record the attitudinal angle of the beacon from the second node. The vehicle to be directed may be a mobile robot.

DISCLOSURE OF PREFERRED EMBODIMENT

Other objects, features and advantages will occur from the following description of a preferred embodiment and the accompanying drawings, in which:

FIG. 4A is a schematic top plan view of the relationship between the head and the body to each other and relative to the environment;

FIG. 4B is a schematic top plan view of alignment between the head and the body using a position encoder;

FIG. 4C is a schematic top plan view of the sign of angles in relation to the front of the robot;

FIG. 5A is a schematic top plan view of the angles and distances between the robot, a predetermined node, and a beacon;

FIG. 5B is an elevational plan view of the robot and beacon of FIG. 5A relative to each other;

FIG. 23 is an illustration of the optical burst output of the beacons of FIG. 22;

FIG. 24 is an enlarged detail of a single burst of FIG. 23;

Figure 1:
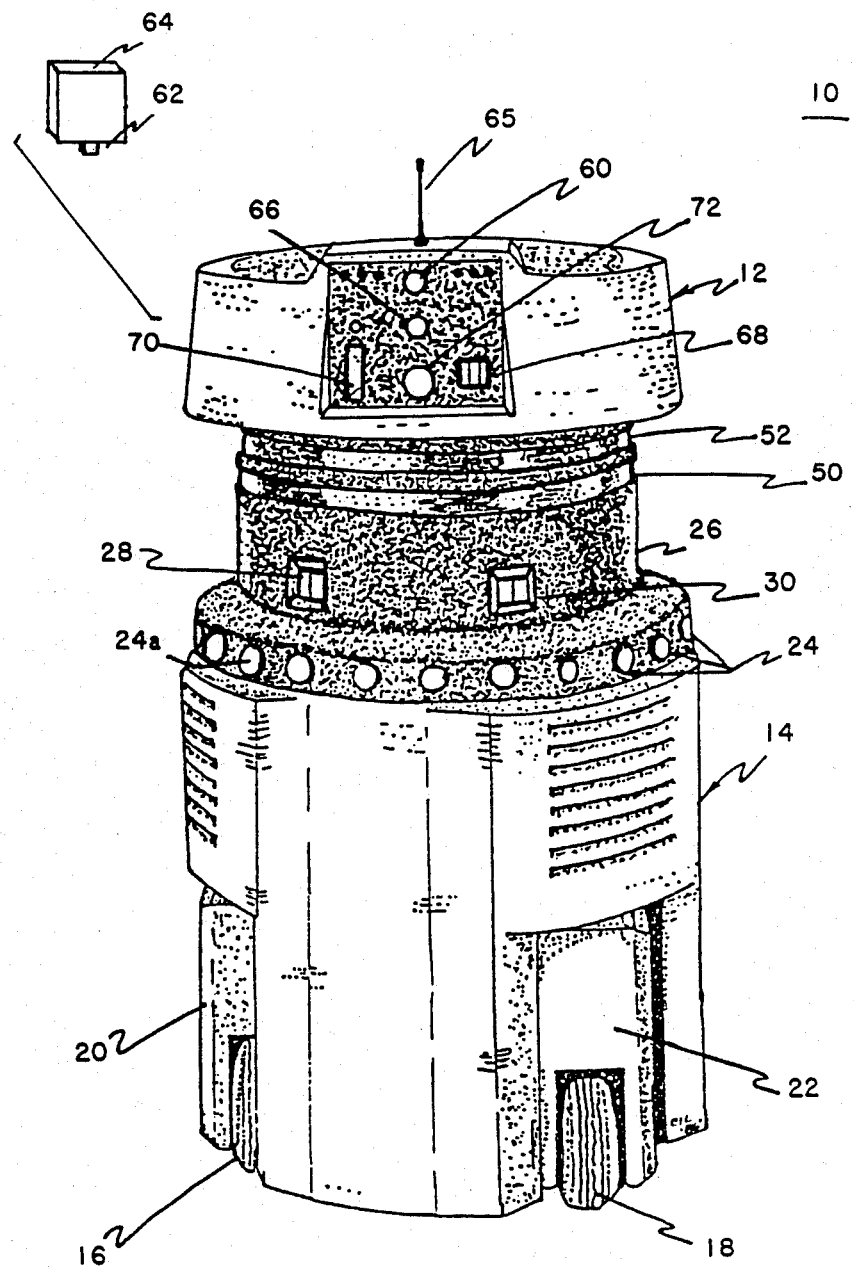
FIG. 1 is an axonometric view of a robot utilizing the beacon navigation system according to this invention.

There is shown in FIG. 1 a vehicle, robot 10 according to this invention including a head section 12 and a base 14 movable on three wheels, only two of which, 16, 18, are visible. The wheels are mounted in three steerable trucks, only two of which, 20 and 22, are visible. There are twenty-four ultrasonic transducers 24 such as the electrostatic transducers of the Sell type available from Polaroid equally spaced at fifteen degrees around the periphery of base 14. One of transducers 24, such as transducer 24a, is designated as sensor zero; its azimuthal heading is utilized as described below. Above that on reduced neck 26 there are located six passive infrared motion detectors 28, 30, 32, 34, 36, 38, only two of which, 28 and 30, are shown. These detectors are equally spaced at sixty degrees apart and may be DR-321's available from Aritech. Just above that are two conductor bands 50 and 52 which are used to engage a charging arm for recharging the robot's batteries. Head section 12 is mounted to base 14 and rotates with respect to base 14 about a central vertical axis. Head section 12 carries an RF antenna 65 for sending and receiving communication signals to a base location or guard station. Head section 14 also includes an infrared sensor 60 for sensing radiation in the near infrared region, e.g. 880 nm, such as emitted from LED 62 of beacon 64, one or more of which are mounted on the walls in the space to be protected by robot 10 to assist in locating and directing robot 10 in the area in which it is to roam. An ultrasonic transducer 66 similar to one of the transducers 24 used for maneuvering and avoidance may be provided for ranging. There is also provided a passive infrared sensor 68 similar to sensors 28 and 30. A microwave transmission and reception antenna 70 and a TV camera 72 which may be turned on when an apparent intrusion has occurred; these are also included in head 12.

Figure 2:
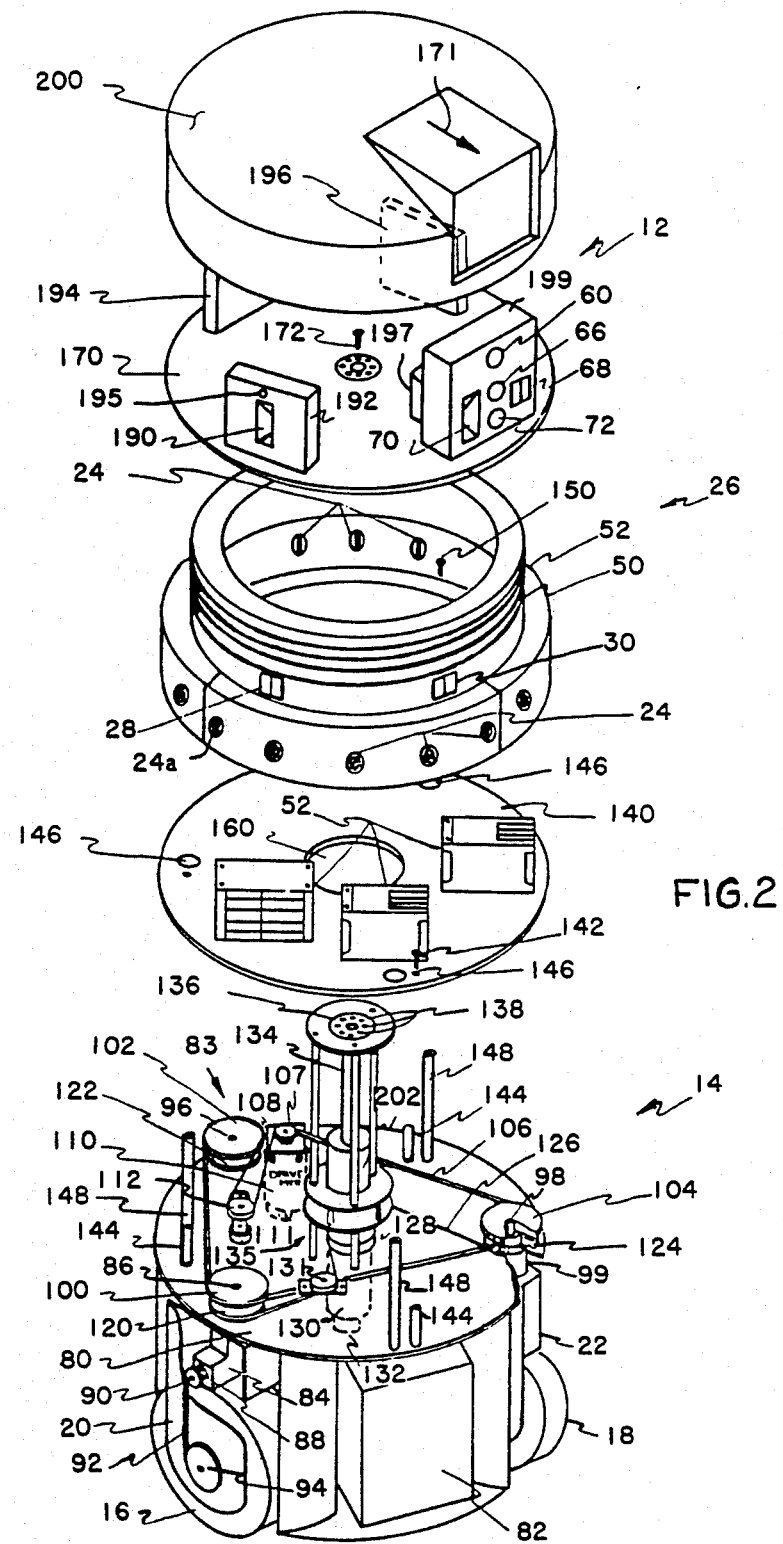
FIG. 2 is a simplified exploded view with parts removed of the robot of FIG. 1.

Base 14, FIG. 2, includes a main chassis 80 which carries three batteries 82 such as globe 12 V 80AH gel cells, only one of which is shown. When fully charged they will operate the robot for twelve hours or more.

Robot 10 is provided with a synchro-drive locomotion system 83. The wheels are steered simultaneously and driven simultaneously. By steering simultaneously, base 14 optimally maintains an azimuthal angle which is fixed in space and serves as the basic reference of the robot to the outside world. Trucks 20 and 22, with wheels 16 and 18 respectively, are suspended from chassis 80. Each truck as indicated at truck 20 includes a right-angle drive 84 which receives input from vertical drive shaft 86 and provides output on horizontal drive shaft 88 to operate pulley 90. Pulley 90 through belt 92 drives pulley 94 attached to the axle of wheel 16. Vertical drive shaft 86 and counterpart drive shafts 96 and 98 are driven by their respective sprockets or pulleys 100, 102, 104 which in turn are driven by endless belt 106 powered by the pulley 107 on output shaft 108 of drive motor 110 mounted beneath chassis 80. An encoder 111 mounted with motor 110 monitors the velocity of the robot. An idler wheel 112 is provided to maintain proper tension on belt 106.

Three additional shafts, only one of which, 99, is shown, concentric with shafts 86, 96 and 98, respectively, are driven by a second set of pulleys or sprockets 120, 122, 124 engaged with drive belt 126 powered by sprocket 128 driven by steering motor 130 mounted beneath chassis 80. Idler pulley 131 is used to maintain tension on belt 126. An encoder 132 is associated with steering motor 130 to provide outputs indicative of the steering position. The steering motor shaft is connected through pulley 128 to extension shaft 134, the top of which is provided with a flange 136 with a plurality of mounting holes 138. Position sensor 135, such as a Hall Effect device, interacts with a magnetic detent on shaft 134 as described below. Electronic chassis 140 is mounted by means of screws 142 on three shorter standoffs 144. Three holes 146 in electronic chassis 140 accommodate the pass-through of longer standoffs 148, which mount neck 26 by means of screws 150. Electronic chassis 140 contains all of the electronic circuit boards and components such as indicated as items 152 that are contained in the base 14, including the status module described infra.

When an electronic chassis 140 and neck 26 are mounted on their respective standoffs, extension shaft 134 and flange 136 and the associated structure are accommodated by the central hole 160 in electronic chassis 140 and the opening in neck 26 so that the head plate 170 may be mounted by means of screws 172 to threaded holes 138 in flange 136. In this way the entire head rotates in synchronism with the trucks and wheels as they are steered by steering motor 130. Arrow 171 represents the frontal, forward-facing orientation of head 12.

In addition to the primary microwave sensor 70 there are three additional microwave sensors only one of which, 190, is visible spaced at ninety degrees about head plate 170 mounted in housings 192, 194, and 196. One or more additional ultrasonic sensors can also be mounted in head 12, e.g., ultrasonic sensor 195 on housing 192. Housing 194 faces directly to the back of the head as opposed to primary microwave sensor 70 which faces front. Housing 194 also contains a second infrared sensor, not visible, which is the same as infrared sensor 68.

Head 12 also contains internal reference sensors. Inclinometer 197, such as the Accustar clinometer sensor available from Sperry Corp., is mounted on the rear portion of external sensor housing 199. Its use in X-axis calibration is described below.

Cover 200 protects the electronics on head plate 170. All of the electrical interconnections between head 12 and base 14 are made through slip rings contained in slip ring unit 202 mounted about extension shaft 134 in base 14.

Figure 3:
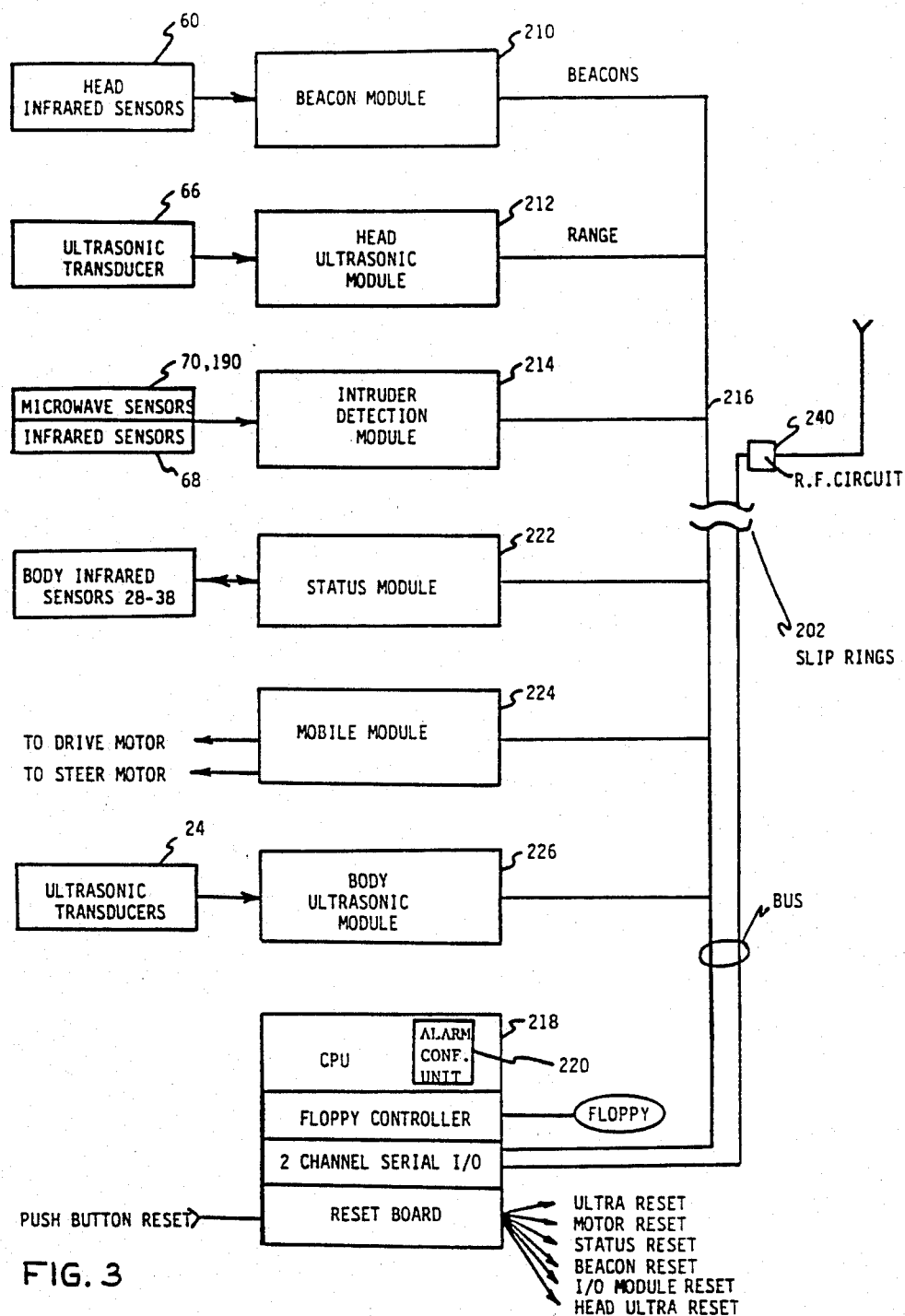
FIG. 3 is a block diagram of the electronic modules included in the robot of FIGS. 1 and 2.

Head 12, FIG. 3, includes three electronic portions: beacon module 210, head ultrasonic module 212, and intrusion detection module 214. Beacon module 210 responds to the IR sensor 60 to determine what angle the beacon 64 is with respect to the robot. That angle is fed on bus 216 through the slip ring unit 202 to the main CPU 218. Beacon module 210 is also responsive to inclinometer 197.

Head ultrasonic module 212 responds to ultrasonic transducer 66 to provide ranging information on bus 216 to CPU 218. Intruder detection module 214 responds to the four microwave sensors such as sensors 70, 190, and the two IR sensors such as sensor 68, to provide indications as of yet unconfirmed intrusion events. These events are processed by the alarm confirmation unit 220 in CPU 218 to determine whether a true confirmed intrusion has occurred.

In the body section 14, there is included status module 222, mobile module 224, body ultrasonics module 226, and CPU 218. Status module 222 responds to the six infrared sensors 28-38 to provide an indication of an intrusion. Status module 222 may also monitor fire and smoke detectors, diagnostic sensors throughout the robot such as inclinometer 197, as well as chemical and odor detectors and other similar sensors. Mobile module 224 operates and monitors the action of drive motor 110 and steering motor 130. The twenty-four ultrasonic transducers 24 provide an input to the body of ultrasonic module 226, which provides digital range information for the robot. Finally, body 14 contains CPU 218, which in addition to the alarm confirmation unit 220 also interconnects with a floppy disk controller, a two-channel serial I/O board, and a reset board which receives inputs from a pushbutton reset and CPU 218 and provides as outputs ultrasonic resets, motor resets, status resets, beacon resets, I/O module resets and head ultra resets. CPU 218 also receives inputs from RF antenna 65 through RF circuit 240.

Several notations describe the orientation of head 12 to body 14, as shown in FIG. 4A. Arrow 300 represents its front, which faces the direction of travel, shown as front arrow 171 in FIG. 2. The azimuthal orientation of body 14, FIG. 4A, is represented by point 302, hereinafter referred to as sensor zero. Sensor zero is a designated, fixed point on body 14 itself, e.g., sensor 24a, FIG. 2. The angle between head front 300 and body sensor zero is $\theta_D$. The azimuthal angular distance from global zero to sensor zero is represented by $\theta_B$; arrows 304 represent the designated orientation for the surrounding environment.

Head 12 is realigned with base 14 using position sensor 135 and magnetic detent 306 on shaft 134 as shown in FIG. 4B. This is accomplished at designated homing nodes by rotating head 12, that is, by pivoting the three steerable trucks, about its vertical axis such that magnetic detent 306 is brought into alignment with position sensor 135 of base 14. The head direction angle $\theta_D$ is then set to zero; this and other operational parameters of the robot are maintained in updatable memory, hereinafter referred to as the blackboard, in CPU 218, FIG. 3.

The sign of angles is determined as shown in FIG. 4C. Object 290 is directly aligned with robot front 300. Angles in the clockwise direction, indicated by arrow 291 between object 290 and object 292, are positive in value. Angles in the counterclockwise direction, shown by arrow 293 toward object 294, are negative.

The position and orientation of robot 10 relative to beacon 64a is shown in FIG. 5A. $\theta_{HA}$ is the actual horizontal angle, that is, the azimuthal angle, between head front 300 and beacon 64a. Beacon 64a has a 30° transmitter beam width, indicated by arrow 303, which is detected by sensor 60, FIGS. 1 and 2, within its 22° field of view. The expected horizontal angle, $\theta_{HE}$, is zero when robot 10 is properly following path 308 toward wall 301. Horizontal deviation from path 308 is designated by the variable y, here shown by arrow 310. The orientation of path 308 is represented by angle $\theta_p$, which is 180° in relation to coordinate arrows 304.

Dashed line 312 parallels path 308. The angular deviation from the direction of path 308 to front 300 is represented by head-path angle $\theta_M$. Sensor zero path angle $\theta_{SZ}$ is the angle from the path to sensor zero 302. Head direction angle $\theta_D$ is equal to the sensor zero path angle $\theta_{SZ}$ subtracted from head-path angle $\theta_M$. Angle $\theta_{SZ}$ is equal to path angle $\theta_P$ minus body angle $\theta_B$.

Thus, body angle $\theta_B$ serves as the basic reference for robot 10 to the outside world. The actual direction of an intruder, a fire or a path is determined for the robot in relation to sensor zero whose heading is updated by body angle $\theta_B$.

Body angle calibration, that is, the updating of angular orientation between sensor zero and global zero, can be conducted at any place along path 308. Calibration of the distance travelled in the X direction, shown by arrow 314, must be conducted at a predetermined location such as node 316. As shown in FIG. 5B, the vertical angle, that is, the altitude angle, between beacon sensor 60 and LED 62a of beacon 64a is classified as actual vertical angle $\theta_{VA}$. This is obtained while robot 10 is distance $f_A$ from wall 301. The expected vertical angle $\theta_{VE}$ is learned by initially placing robot 10 at node 316 to measure the angle. Inclinometer 197, FIG. 2, is utilized to correct for unevenness in terrain.

As described below, the expected distance $f_E$ is measured from node 316 to wall 301 and can be used instead of expected vertical angle $\theta_{VE}$. In either case, the vertical distance between the height of beacon sensor 60 and LED 62a must be measured, represented by vertical distance e and shown by arrow 318. When the distance between wall 301 and vertical axis $V_A$ is desired, the robot's radius r is added to the trigonometric calculations.

The actual distance between robot 10 and wall 301 can also be measured by head ultrasonic sensor 66 within its 15° field of view. This distance measurement is denoted as horizontal distance $R_{HA}$ and is shown by dashed arrow 320.

Figure 5C:
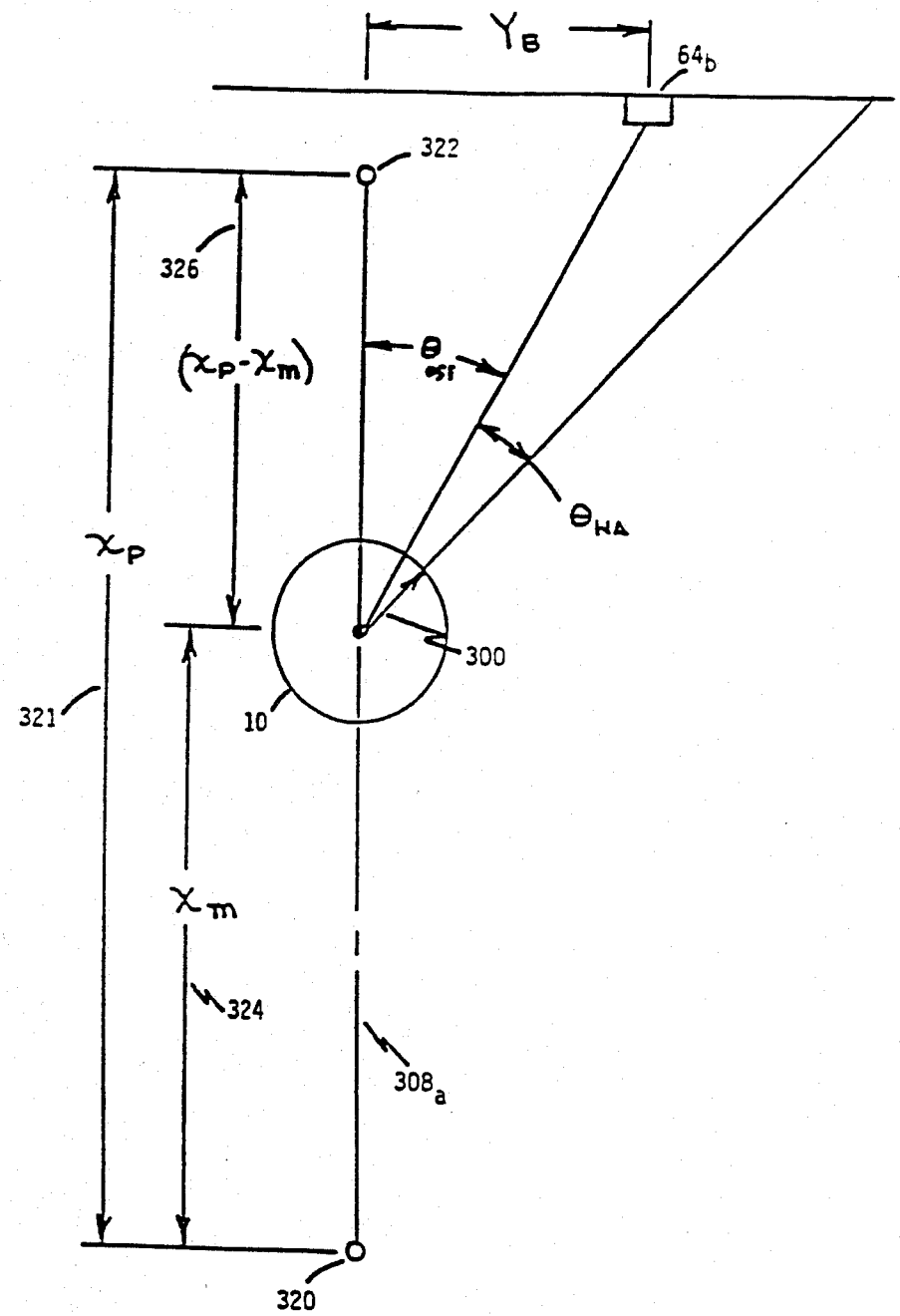
FIG. 5C is a schematic top plan view of the angles and distances between the robot, a selected path, and an offset beacon.

Geometric parameters describing the location of robot 10 along the path and its orientation relative to an offset beacon are shown in FIG. 5C. The path distance $X_p$ is represented by line 321 between start node 320 and end node 322. Line 324 represents the distance travelled, $X_M$, and line 326 designates the remaining distance to travel, $X_p - X_m$.

If the reference to be observed by robot 10 such as beacon 64b, is not directly aligned with path 308a, the angle between beacon 64b and path 308a is denoted by offset angle $\theta_{off}$. Head horizontal angle $\theta_{HA}$ represents the difference in orientation between head front 300 and beacon 64b.

Figure 6:
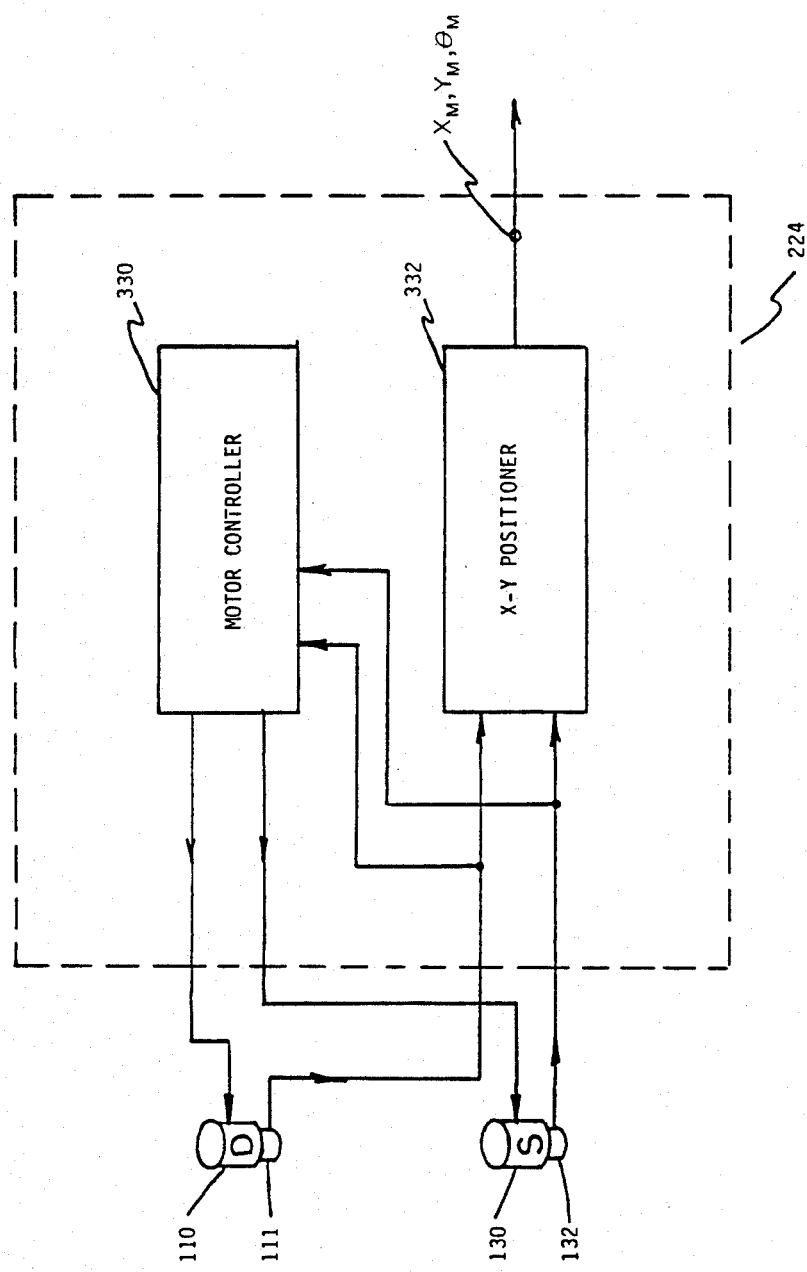
FIG. 6 is a schematic block diagram of the mobile module of FIG. 3.

An estimate of distance travelled and of location is maintained by dead reckoning accomplished by X-Y positioner 332 of mobile module 224, FIG. 6. Mobile module 224 includes motor controller 330, which controls drive motor 110 and steering motor 130. Distance travelled is determined by encoder 111 which provides this information to X-Y positioner 332. Similarly, steering encoder 132 provides change in orientation information to positioner 332, which accordingly outputs path distance $X_M$, path deviation $Y_M$, and head orientation $\theta_M$, which denotes the angle of the head to the path. Encoders 111, 132 also provide feedback to motor controller 330.

Navigation of the robot through its environment is described in relation to successive nodes. Map 338, FIG. 7A, includes selected nodes 340 which have a known distance and angle among each other. The robot travels toward successive goal nodes. For example, if the robot is at node 4, the starting node, the robot can be directed to visit goal node 7. The paths required to accomplish this are designated in FIG. 7B as the global path 342. Global path 342 designates consecutive navigation nodes, and a list of paths between these nodes. At each node, the robot must change headings, recalibrate estimated position, and head towards the next node.

Figure 7A:
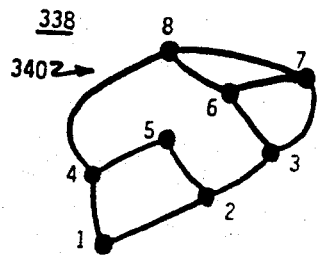
FIG. 7A is a schematic diagram of a map of a number of nodes established in the environment.
Figure 7B:
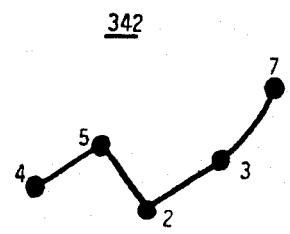
FIG. 7B is a schematic diagram of a global navigation path to a goal node within the map of FIG. 7A.
Figure 7C:
FIG. 7C is a schematic diagram of local navigation between two nodes of the global path of FIG. 7B.

Travel along the particular path is represented by path 344, FIG. 7C. Local navigation along path 344 moves the robot from node 4 to node 5.

The spatial models represented by FIGS. 7A–7C simply represent navigable paths through the environment and do not actually describe the surrounding environment. This system requires much less information than other systems utilizing more complicated techniques such as geometric modeling of the environment.

In addition to the identification of the starting node and the list of successive nodes to visit, the predetermined map information also includes a number of characteristics for each path. These include the distance of the path and its angle, $theta_P$, in relation to global zero. The path information may also include the width of the path, and, if a beacon is disposed at the end of the path, the beacon code, distance f, height e, and expected vertical angle $theta_{VE}$. The intensity of the beacon can be monitored to confirm proper operation of the beacon if it is an active beacon; expected intensity of passive beacons such as reflectors or bar codes are not required. One or more position calibration techniques can be specified, such as X-axis calibration, ultrasonic end-path calibration, and body-angle calibration.

Figure 8A:
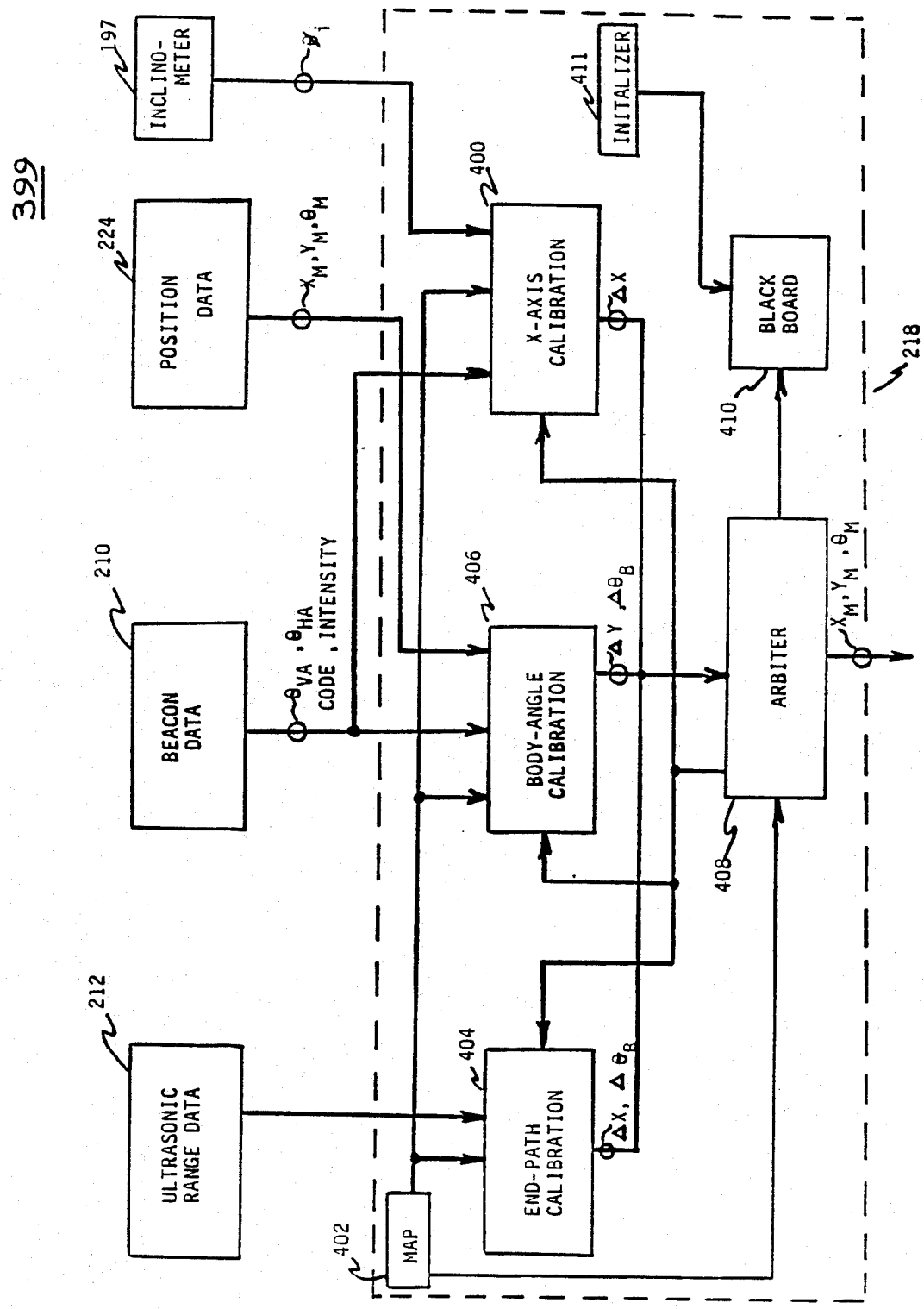
FIG. 8A is a schematic block diagram of position estimation.

Robot 10 uses one or more position calibration systems 399 to estimate its position as shown in FIG. 8A. The position calibration systems 399 are located within CPU 218 and draw upon several modules. X-axis calibration system 400 obtains the vertical deviation $phi_i$ from inclinometer 197, information from map 402, and actual vertical angle $theta_{VA}$ from beacon module 210.

End-path calibration system 404 provides an alternate technique of determining the difference in travel along the X-axis and determining adjustments to body angle $theta_B$. End-path calibration system 404 draws upon map 402 and ultrasonic range data from module 212.

Body-angle calibration system 406 corrects for accumulated error in orientation due to such factors as drift and precession of base 14. System 406 is responsive to map 402, beacon data including $theta_{HA}$ from beacon module 210 and data from mobile module 224 representing present estimated position and head orientation.

After obtaining one or more calibrations from calibration systems 400, 404 and 406, arbiter 408 updates blackboard 410 which maintains current status information for robot 10 including its actual position. Initializer 411 supplies initial values to blackboard 410, such as zeros generated for body angle $theta_B$. Arbiter 408 provides corrected $Y_M$ and $theta_M$ values to X-Y positioner 332, FIG. 6 while the robot is moving and while stationary provides $X_M$, $Y_M$ and $theta_M$ corrections to motor controller 330 which are implemented as directed.

Arbiter 408 uses end-path calibration from system 404 when nearing the end of the path. Body-angle calibration from system 406 is examined along the path and at specified nodes. X-axis calibration from system 400 is obtained only at selected nodes.

Figure 8B:
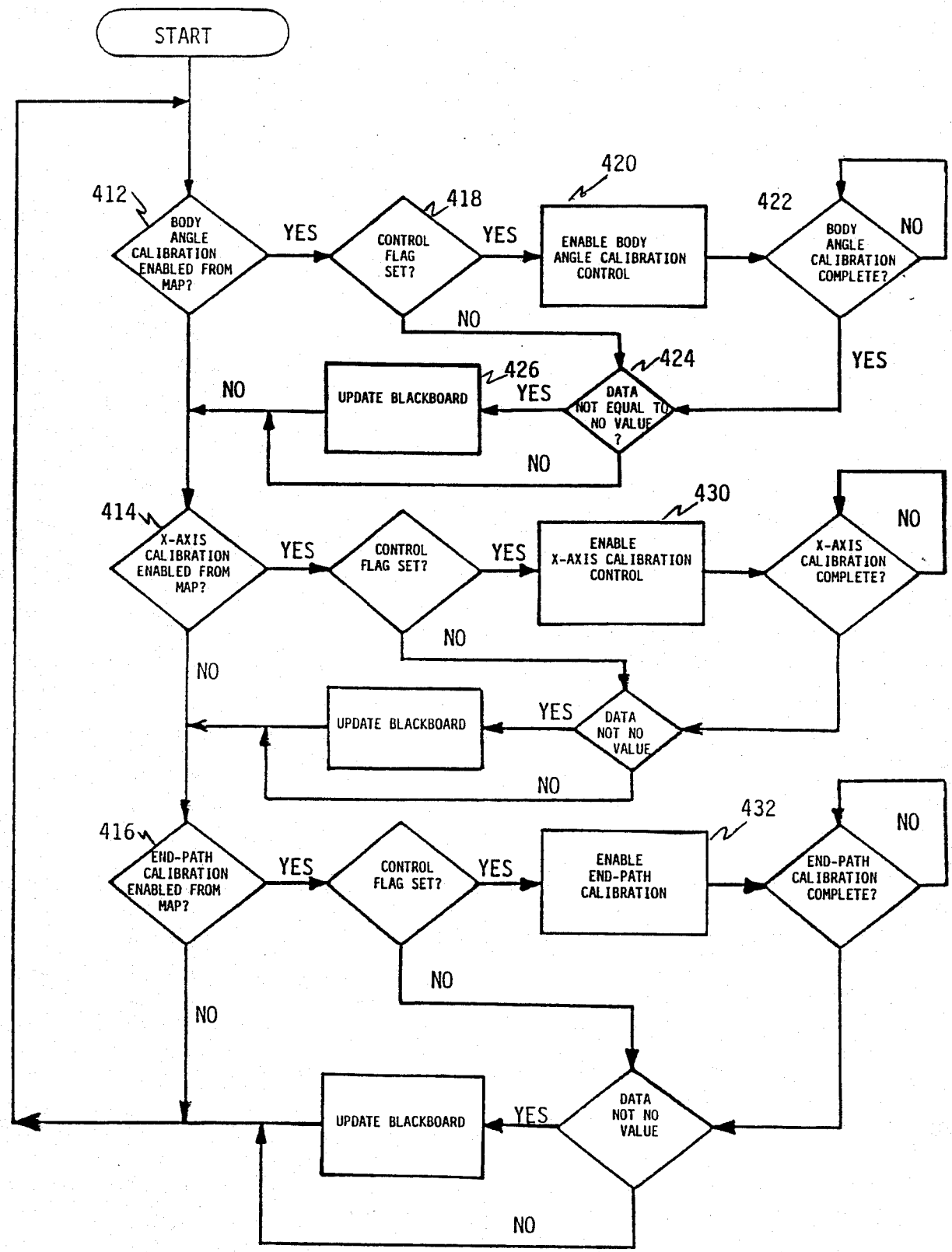
FIG. 8B is a flow chart of the arbiter of FIG. 8A.

The operation of arbiter 408 is shown in FIG. 8B. Calibration systems continually output calibration values or "NO VALUE" but are sampled to obtain their estimations of position only if enabled from map 402 for the particular path or node the robot presently occupies. Calibration of body angle, X-axis, and end-path position are successively accessed, steps 412, 414 and 416, respectively. Further, the arbiter decides whether to relinquish control of the robot when a calibration system requests motor control.

If map 402 contains the appropriate enable for body angle calibration, step 412, the arbiter observes, step 418, whether calibration system 406 has requested control by setting its control flag. If it has, control is provided, step 420, unless an external override command (not shown) is present. The arbiter waits for body angle calibration to be completed, step 422, and then examines whether the output calibration data is other than "NO VALUE". Valid data is entered into blackboard 410, step 426 while the operation proceeds directly to step 414 if the data are NO VALUE.

When the control flag is not set, step 418, examination of the output data is immediately made, step 424. Similarly, the outputs of X-axis calibration and end-path calibration are obtained, as represented by loops 430 and 432, respectively. During these calibrations, steps 434 and 436, control remains with the respective calibration systems until the difference between the actual and expected position of the robot along the path becomes zero.

Figure 9:
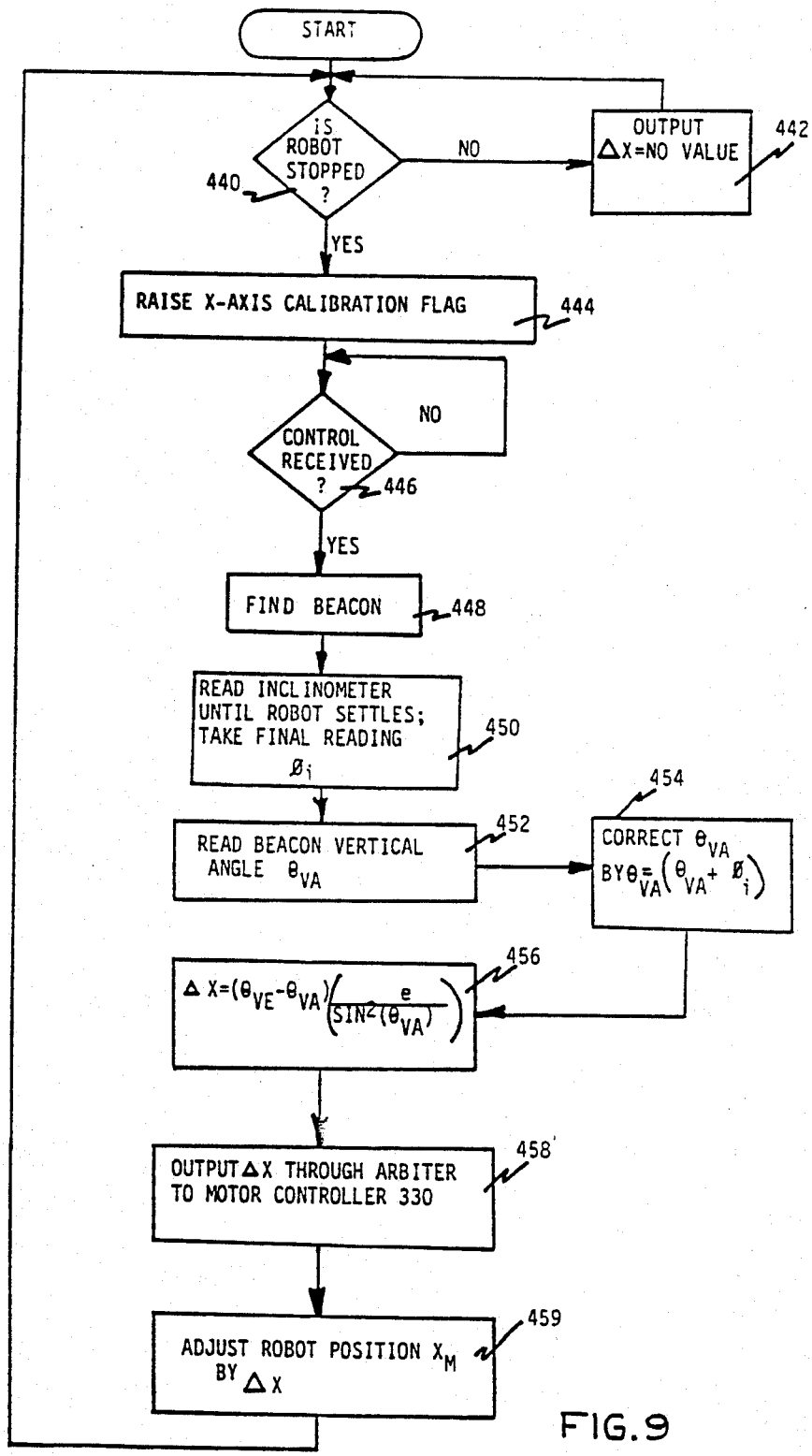
FIG. 9 is a flow chart of the X-axis calibration of FIG. 8A.

The operation of X-axis calibration system 400 is shown in FIG. 9. If the robot is not stopped, step 440, a distance correction of "delta X equal to NO VALUE" is provided, step 442. When the robot is in a fixed position the X-axis calibration flag is raised, step 444, and the calibration system waits until control is received, step 448. The beacon is located, step 446, and inclinometer 197 is read until motion of the robot settles, step 450. Once stable, the final inclination reading, $phi_i$ is taken, as is the stable reading of vertical angle $theta_{VA}$, step 452. Actual vertical angle $theta_{VA}$ is corrected by inclination $phi_i$ which has a positive or negative value depending whether robot 10 is inclined toward or away from the beacon, respectively, step 454.

The difference between the expected X distance and the actual X distance is obtained in step 456 as represented by the trigonometric formula $$\Delta X = (\theta_{VE} - \theta_{VA}) \frac{e}{\sin^2(\theta_{VA})} \tag{1}$$

where delta X is the difference in position along the X-axis, $theta_{VE}$ is the expected vertical angle, $theta_{VA}$ the actual vertical angle, and e is the vertical elevation of the beacon as described in FIG. 5B. The value of delta X is provided to motor controller 330 through arbiter 408, step 458. The robot moves along distance $X_M$ by an amount equal to delta X, step 459. The operation cycles to step 440 and the robot is readjusted until a delta X of zero is resolved in step 456.

Other methods of calculating delta X can be used, for example, where the expected horizontal distance between the robot and the beacon is substituted for expected vertical angle $theta_{VE}$. The latter parameter is preferred because it can be obtained empirically in such operations as map making by locating the robot at the node or other predetermined location and instructing it to observe the beacon to learn the vertical angle. This obviates the need for physically measuring the horizontal distance between the robot and the beacon.

Figure 10A:
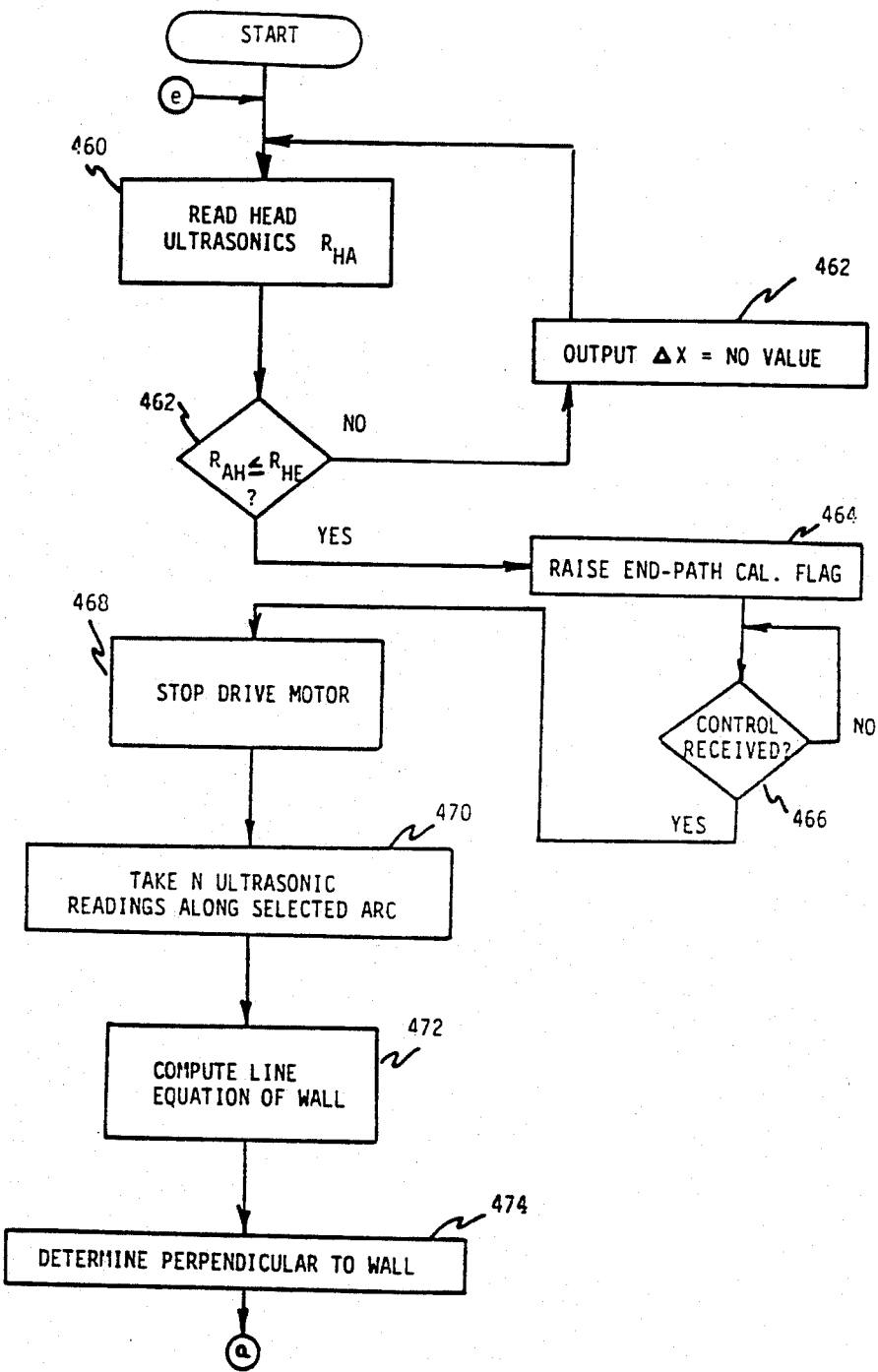
FIGS. 10A and 10B are flow charts of end-path calibration of FIG. 8A.

The operation of the end-path calibration system commences with reading of the head ultrasonic range $R_{HA}$, step 460, FIG. 10A. If the actual range is greater than the expected range, supplied by map 402, an output of "delta X equals no value" is generated, steps 462, 463, respectively.

Otherwise, if the observed range is less than or equal to the expected range, the end-path calibration flag is raised, step 464 and the calibration system waits until control is received, step 466. Once control is obtained, the calibration system commands that the drive motor halt, step 468, and commands head ultrasonic 66 of head 12, FIGS. 1 and 2, to take n ultrasonic readings along a selected arc, such as fifteen readings along a 30° arc, each reading two degrees apart from the others, step 470. The minimum distance is found in step 472.

Figure 10B:
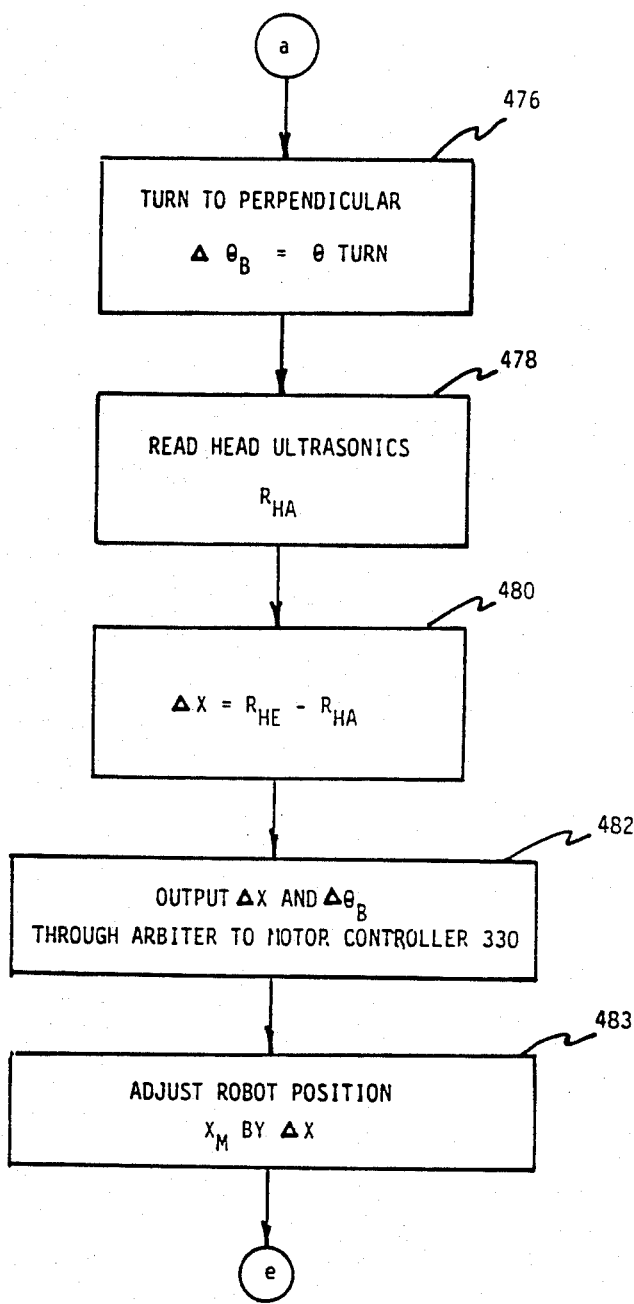

A direction perpendicular to the wall is computed, step 474, e.g., by using the angle which gave the minimum distance in step 472. The robot is commanded to turn to this perpendicular direction, step 476, FIG. 10B, after which delta theta B is set to thetaturn, step 476. Now that the robot is facing directly toward the object, a final reading of the head ultrasonics are taken to obtain distance RHA, step 478. The deviation in distance traveled along the X-axis is determined by the formula $$\Delta X = R_{HE} - R_{HA} \qquad (2)$$

and delta X and delta $theta_B$ are output to motor controller 330 through arbiter 408, steps 480, 482, respectively. The position $X_M$ of the robot is adjusted by delta X, step 483. The end-path calibration system cycles to step 460 to resume monitoring.

The body angle calibration system corrects for accumulated error in orientation which is due to the drift or precession of base 14. Path deviation distance $Y_M$ occurs during obstacle avoidance, for example, and changes in head orientation represented by $theta_M$ can be attributed to rotation of head 12 while tracking a beacon to correct for precession of the body. Body angle calibration system 406 corrects and calibrates for each of these variables.

Figure 11A:
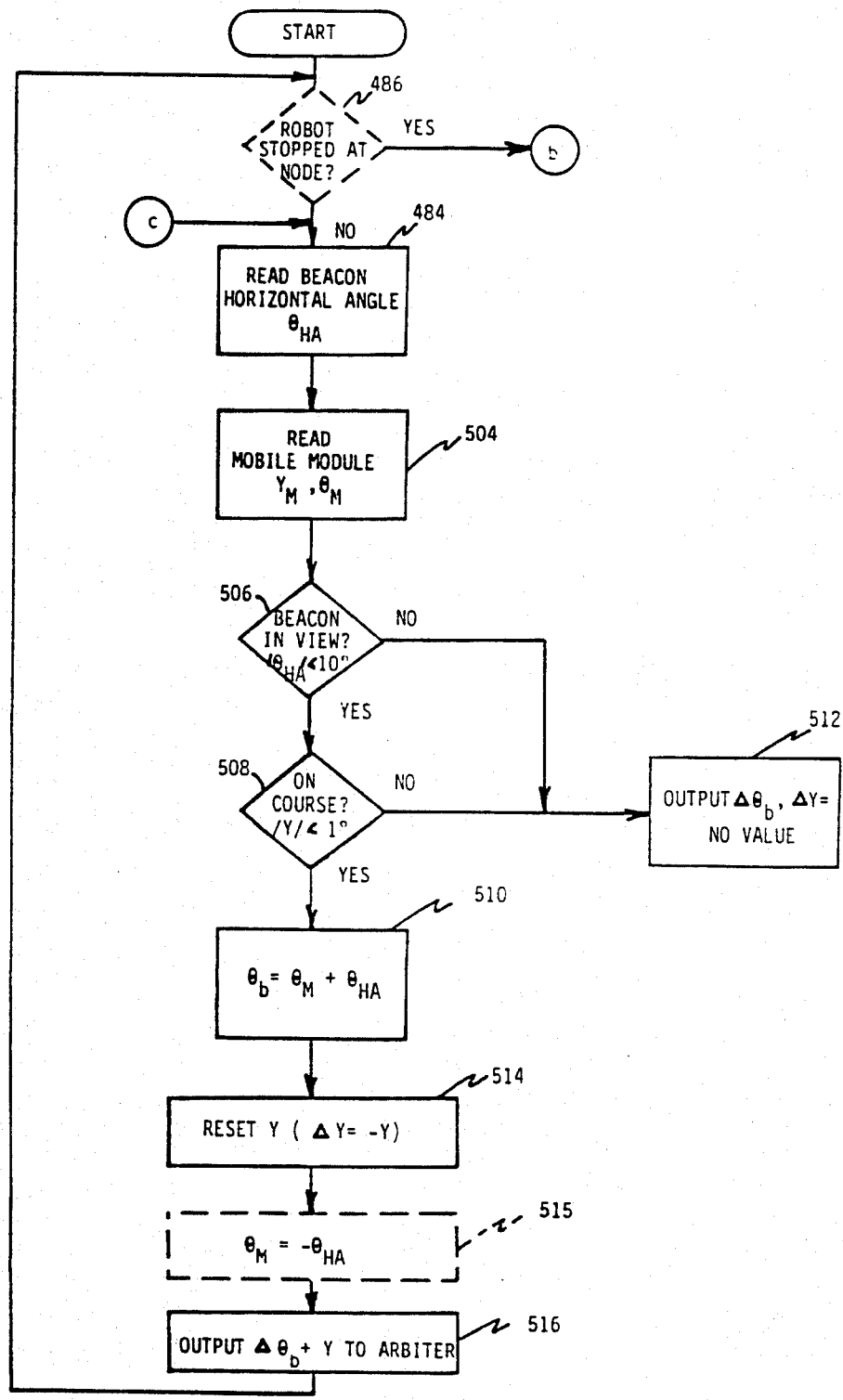
FIGS. 11A and 11B are flow charts of body angle calibration of FIG. 8A.
Figure 11B:
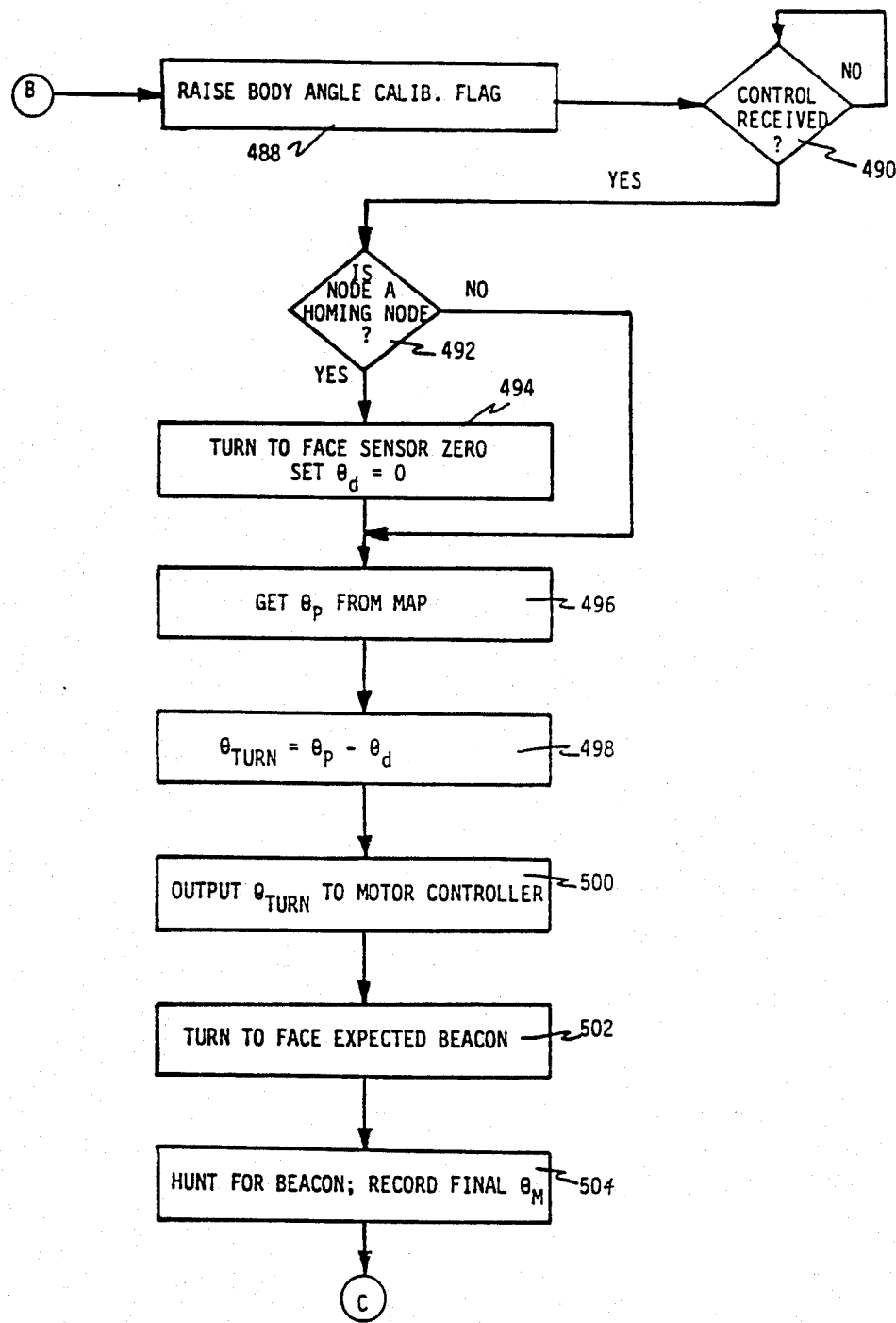

In operation, the beacon horizontal angle $theta_{HA}$ is read, step 484, FIG. 11A. Optionally, such as shown in phantom by step 486, the operation first determines whether the robot is stopped at a node and, if it is, raises body angle calibration flag, step 488, FIG. 11B. Once control is received, step 490, the system determines whether the node is a homing node, step 492. If it is, the robot turns to face sensor zero, step 494 and direction angle $theta_D$ is set to zero. Otherwise, operation proceeds directly to step 496 where path direction $theta_P$, is obtained from the map 402. The turn angle $theta_{turn}$ is set to the distance direction $theta_D$ subtracted from path orientation $theta_P$, step 498.

Once turn angle $theta_{turn}$ is obtained, that value is output to motor controller 330, FIG. 6, step 500. The robot turns to face the expected beacon and hunts for the beacon, steps 502, 504, respectively. The final head orientation $theta_M$ is recorded operation proceeds to step 484, FIG. 11A, and beacon horizontal angle $theta_{HA}$ is read. At this stage, the expected deviation distance $Y_M$ and the head direction $theta_M$ are read from the mobile module, step 504. If the beacon is in view and the robot is on course, meaning that the absolute values of horizontal orientation $theta_{HA}$ is less than 10° and deviation distance Y is less than one foot, calibration of body angle is obtained by determining the increment delta $theta_B$ as equal to the sum of $theta_M$ and $theta_{HA}$, step 510. If either of steps 506 and step 508 are not satisfied, meaning that the robot has significantly deviated from the path, no value is output, step 512, and other calibration systems such as end-path calibration.

Once the increment delta $theta_B$ is determined, Y is reset by setting delta Y to negative Y, step 514, and delta $theta_B$ and Y are provided to the arbiter, step 516. Optionally, head angle $theta_M$ is reset by setting it equal to minus horizontal angle $theta_{HA}$, step 515, shown in phantom. Operation then returns to steps 486, 484 as described above.

In its simplest construction, body angle calibration involves reading the beacon horizontal angle $theta_{HA}$, turning to face the beacon, setting delta $theta_B$ to $theta_{HA}$, and outputting delta $theta_B$. In blackboard 410, delta $theta_B$ is initially set to zero and then incremented as needed by either the body angle calibration or end-path calibration systems.

Figure 12A:
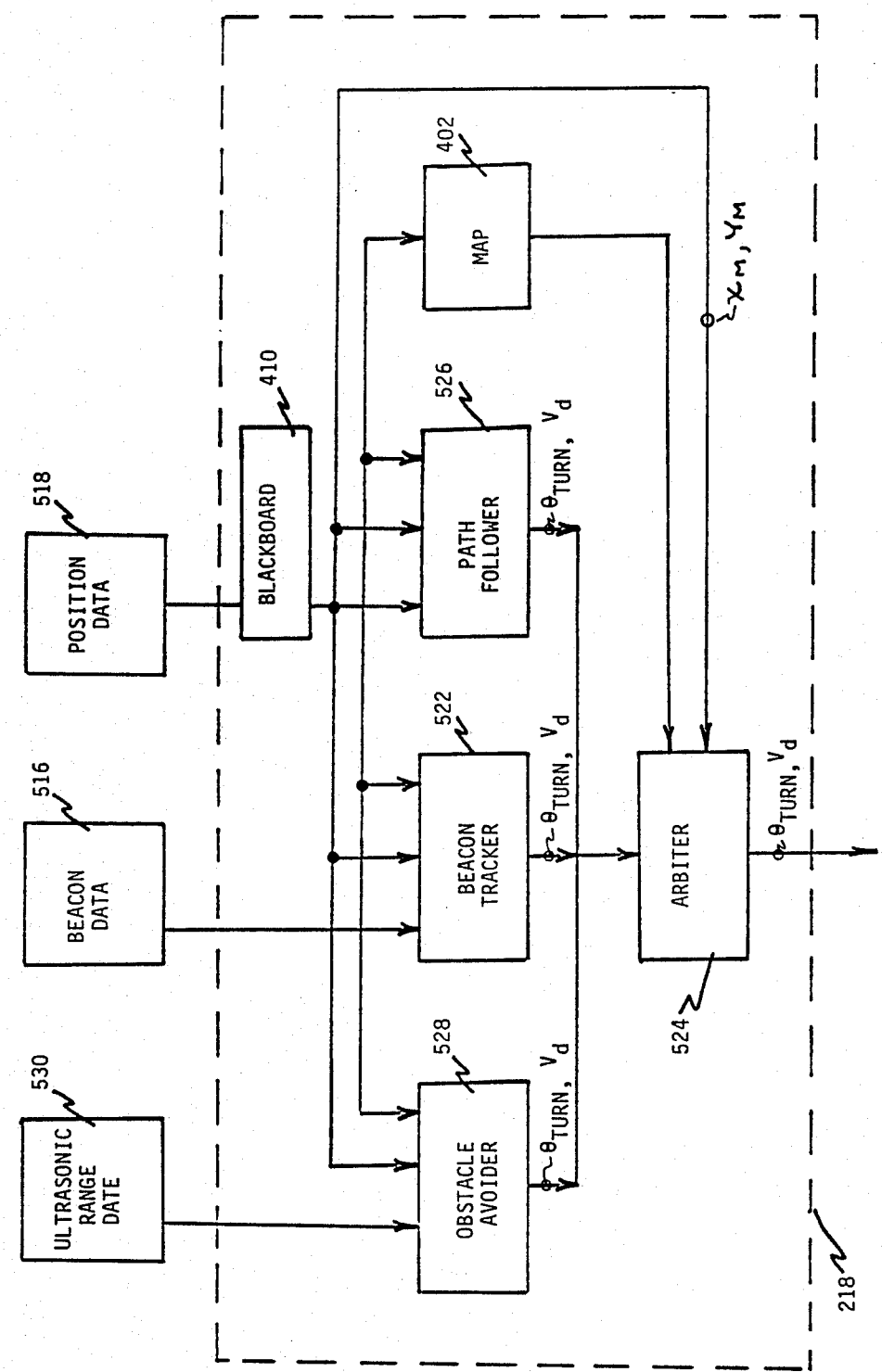
FIG. 12A is a schematic block diagram of local navigation including a beacon navigation system according to this invention.
Figure 12:
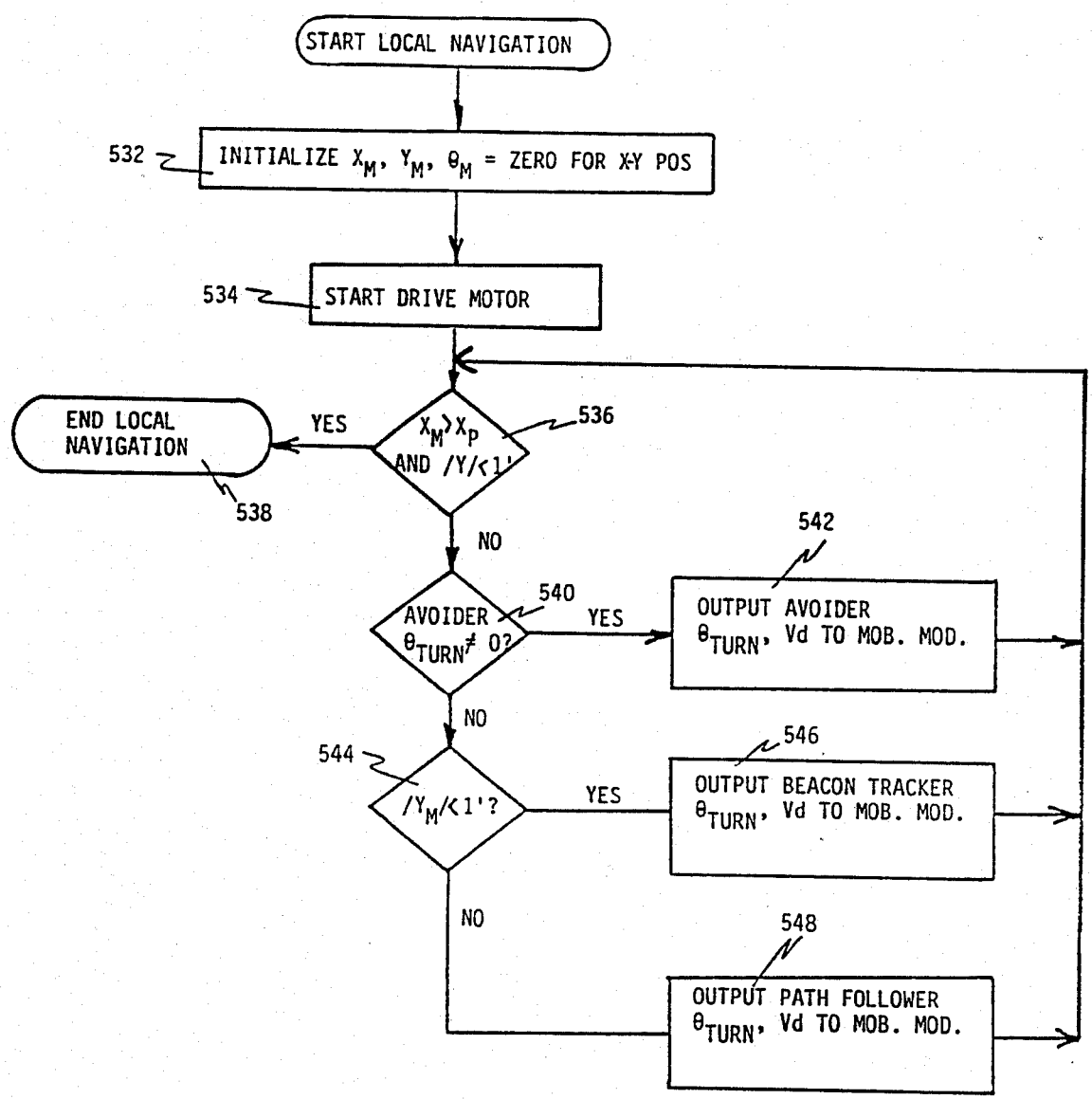
FIG. 12B is a flow chart of the arbiter of FIG. 12A.

Position estimation system 399 ensures that the robot is properly positioned and oriented. Navigation system 520, FIG. 12A, accurately guides the robot along a path toward a destination while avoiding obstacles in the path. Navigation system 520 provides a turn angle $theta_{turn}$ and a drive velocity $V_d$. Obstacle avoider system 528, beacon tracker 522 according to this invention, and path follower 526 continually output values for $theta_{turn}$ and $V_D$. However, motor controller 330 does not receive these values unless approved by arbiter 524.

When a beacon is placed as a marker proximate a destination, the output of beacon tracker 522 is directed by arbiter 524 to motor controller portion 330 of mobile module 224. Beacon tracker 522 utilizes horizontal angle $theta_{HA}$ from beacon data 516 from beacon module 210, position data 518 from mobile module 224 as updated on blackboard 410, and information from map 402. If the beacon is not within a certain azimuthal angle from the head orientation of the robot, or when no beacons are present, path follower 526 provides turn angle $theta_{turn}$ and the appropriate drive velocity $V_D$. Path follower 526 performs dead reckoning utilizing position data 518 from mobile module 224 and expected data from map 402.

By providing the robot with obstacle avoider system 528, the robot can operate in a partially unknown environment where obstacles may arise in the path. Obstacle avoider 528 utilizes ultrasonic data 530 from body ultrasonic module 226, head-path angle $theta_M$, and data from map 402. The local navigation system 520 is initialized at each node as described below.

The operation of arbiter 524 is shown in FIG. 12B. Upon starting local navigation, the parameters $X_M$, $Y_M$, and $theta_M$ are set to zero in the X-Y positioner 332. The drive motor is started, step 534, and the navigation system runs until $X_M$ is equal to or greater than the path distance $X_P$ and the absolute value of the deviation distance $Y_M$ is less than one foot, step 536. If these conditions are satisfied, local navigation is ended, step 538; otherwise, the navigation system continues to operate until the robot is brought quite close to the desired destination node. The final adjustment in position is provided by position estimation system 399 as described above.

Until these conditions are satisfied, local navigation 520 examines the output first of obstacle avoider 528, then beacon tracker 522, and finally path follower system 526. As shown in step 540, if avoider system 528 provides a turn angle of greater than zero, its output is provided to motor controller 330 of the mobile module, step 542. If the avoidance turn angle $theta_{turn}$ is zero, and the deviation distance $Y_M$ is less than one foot, theta$_{turn}$ and V$_D$ of beacon tracker system 522 are provided to mobile module, steps 444 and 546, respectively. Otherwise, the dead reckoning of the path follower 526 is provided to mobile module 224, step 548.

Figure 13:
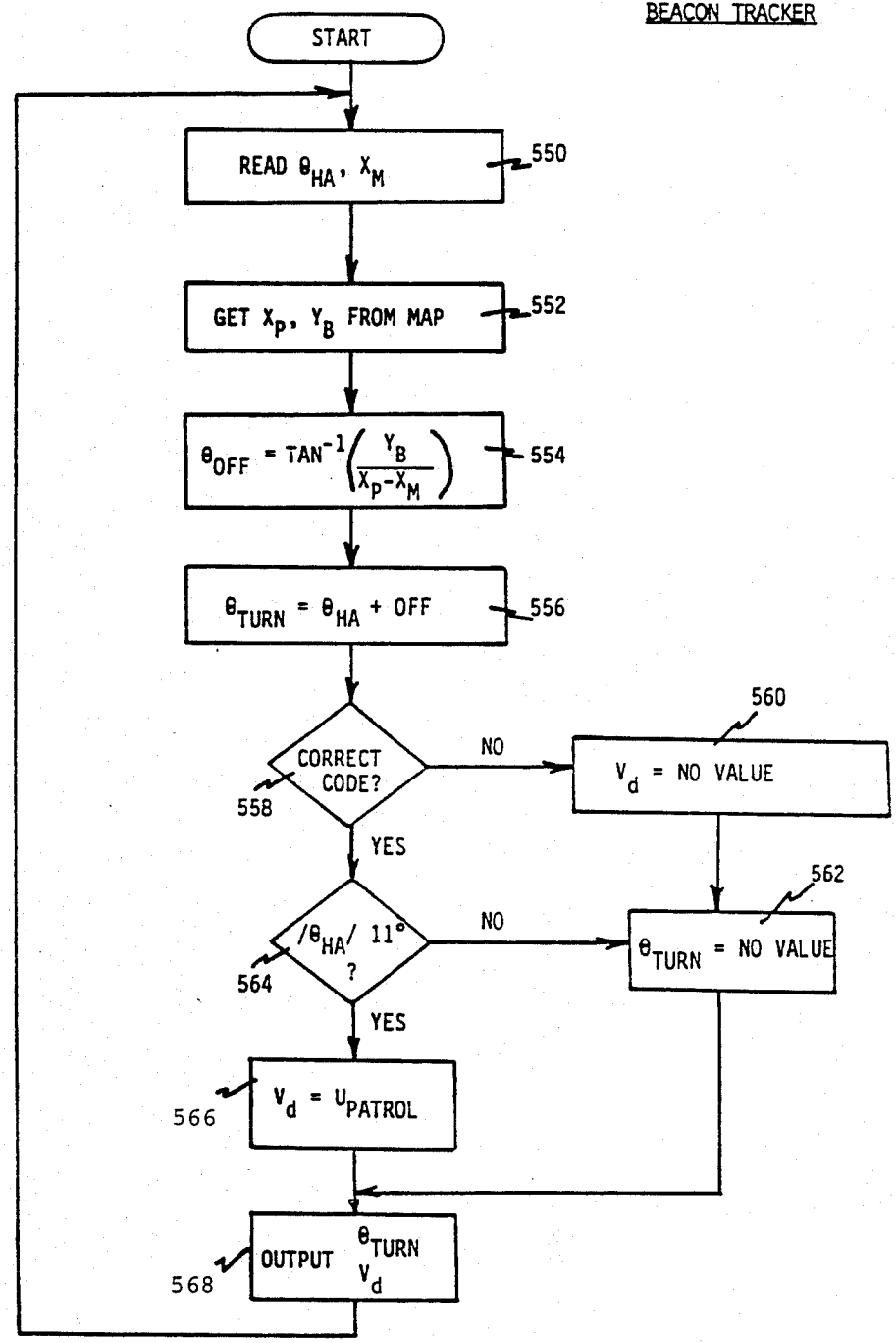
FIG. 13 is a flow chart of the beacon tracking system of FIG. 12A.

The operation of the beacon tracker system according to this invention is shown in FIG. 13. The horizontal theta$_{HA}$ and the distance traveled X$_M$ are read from blackboard 410 and the path distance X$_P$ and known horizontal distance Y$_B$ of the beacon from the path are obtained from the map, steps 550 and 552, respectively. Horizontal distance Y$_B$ represents the offset distance of the beacon from the path as shown above in FIG. 5C. The offset angle theta$_{off}$ is determined in step 554 by the formula $$\theta_{off} = -\tan^{-1}\left(\frac{Y_B}{X_p - X_M}\right) \quad (3)$$

The turn angle theta$_{turn}$ is equal to the sum of the horizontal angle theta$_{HA}$ and offset angle theta$_{off}$, step 556. When the beacons are provided with unique identifying codes, as described below, the correct code must be present, step 558, or velocity V$_d$ and turn angle theta$_{turn}$ are set to no value, steps 560 and 562, respectively. If the correct code is present and the absolute value of the direction from the font of the head of the robot to the beacon is less than 11°, step 564, velocity V$_D$ is set to the patrol velocity V$_{patrol}$ and is provided as output along with the turn angle theta$_{turn}$, steps 566 and 568, respectively. Operation then returns to step 550.

An important feature of these navigation systems is that they output values continuously. The mobile module can accept new commands during execution of turns and changes of velocity, as directed by arbiter 524, to rapidly adjust its operation and provide for smoother turning and acceleration changes for the robot.

Figure 14:
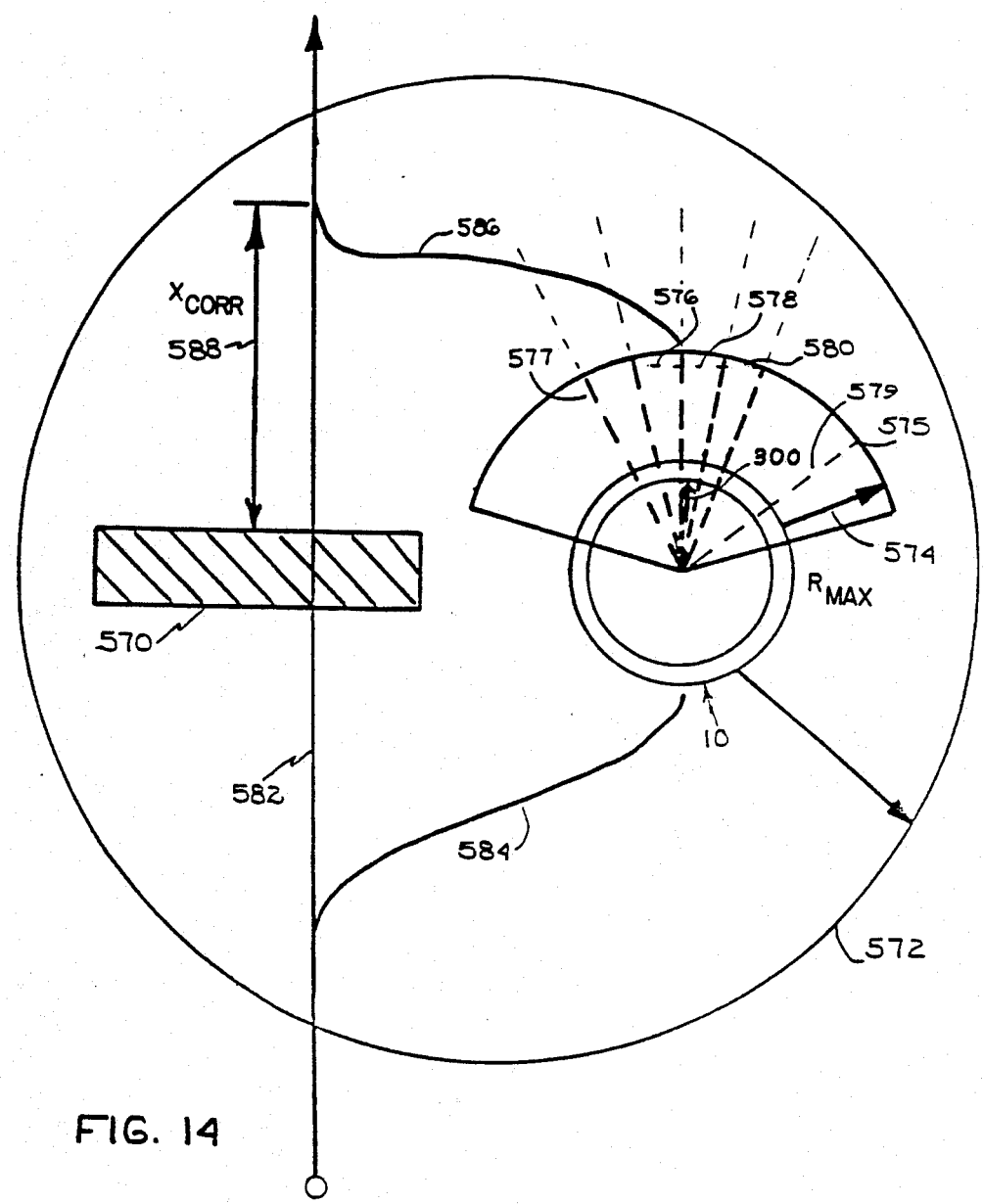
FIG. 14 is a schematic top plan view of a robot navigating around an obstacle.

Avoidance and path following of robot 10 in relation to obstacle 570 are shown in FIG. 14. Body ultrasound transducers 24, FIGS. 1 and 2, provide a 25-foot range about robot 10 as indicated by circle 572. However, for obstacle avoidance, the range of the sensors is ignored beyond maximum range R$_{max}$, indicated by arrow 574, e.g. three feet. Further, a limited sensor arc 575 of 135°, or 67.5° to either side of the desired direction heading is imposed. The field of view of the avoider therefore utilizes the 15° field of view of the sensor oriented toward the desired direction, indicated by sector 576, and four sensors to either side of it, such as sensors in sectors 578, 580. Note that front 300 is oriented with sector 578, and not with sector 576, since face direction 300 is not oriented in the desired direction.

For velocity calculation, however, the field of view, between dashed lines 577, 579, is established relative to the forward facing direction, represented by direction arrow 300. Velocity field of view 577, 579 is a 75° arc which utilizes the forward facing sensor and two sensors on each side of that sensor.

While the desired path is represented by line 582, the actual path traveled during object avoidance is illustrated by path 584. Once clear of the obstacle 570, in terms of the avoider field of view 575, robot 10 is returned to path 582 along route 586 using the path following system. The path following system attempts to return robot 10 to path 582 within correction distance X$_{corr}$, shown by line 588. Once returned to the path, robot 10 proceeds to follow a beacon, if present, or to continue path following.

Figure 15A:
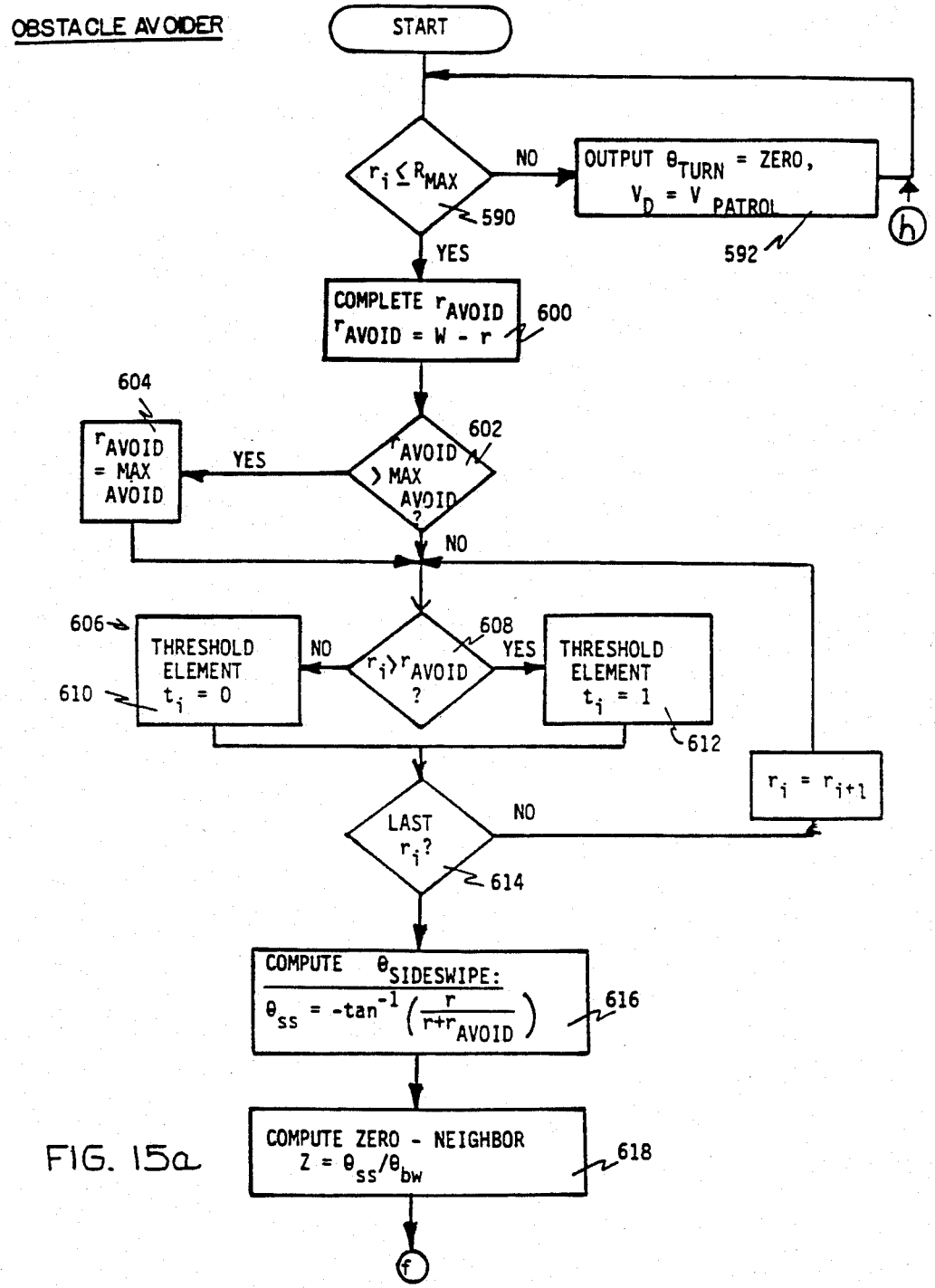
FIGS. 15A–15C are flow charts of the obstacle avoider of FIG. 12A.
Figure 15B:
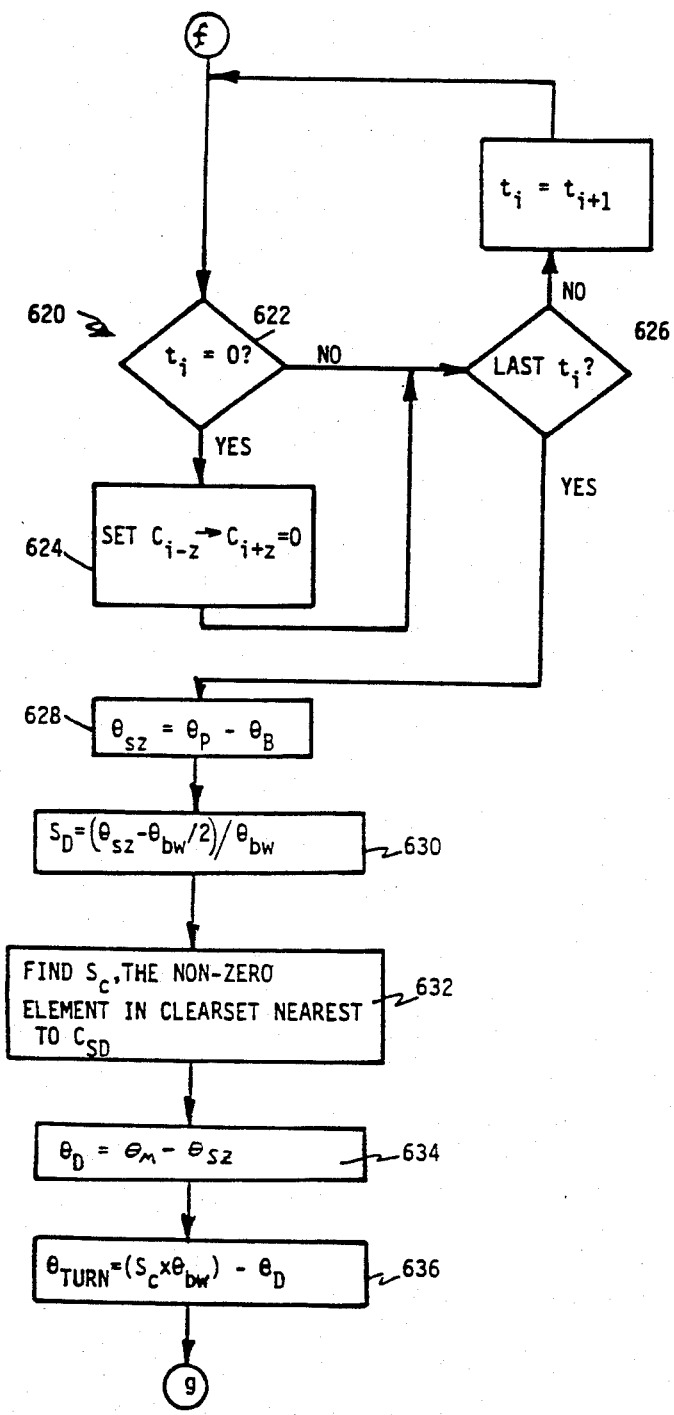
Figure 15C:
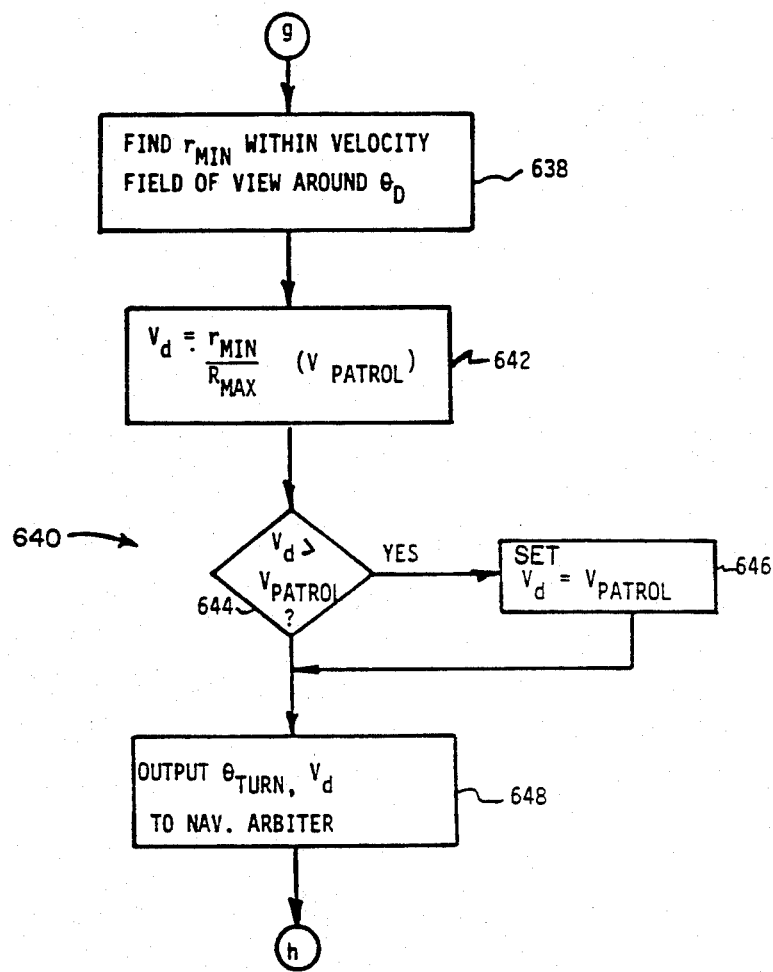

The operation of obstacle avoider system 528 is shown in FIGS. 15A–15C. The range of each sensor r is examined for each sensor i, where i is the index of the sensors. The range of each sensor ri is monitored to determine when it is within range R$_{max}$, step 590. As shown in step 592, turn angle theta$_{turn}$ is set to zero and the drive velocity V$_d$ is set to the patrol velocity, until an obstacle comes within avoidance range.

Figure 16:
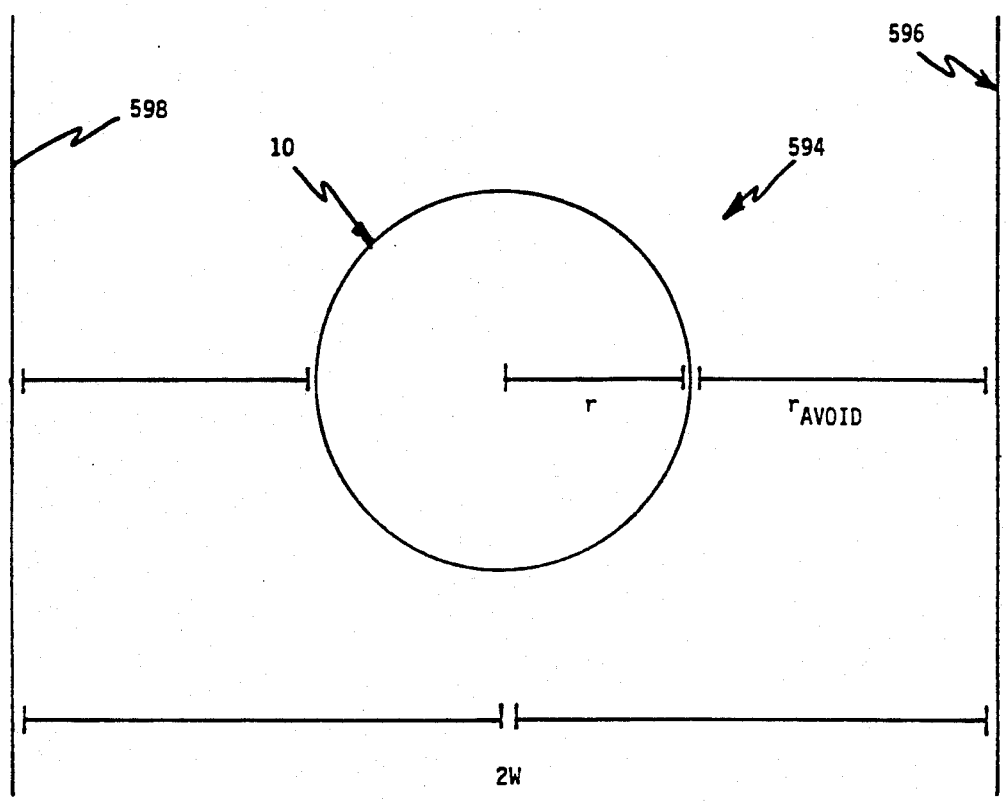
FIG. 16 is a schematic top plan view of the determination of avoidance distance in a corridor.

To prevent damage to the robot, obstacle avoider system 528 must take into account the width of the robot. As shown in FIG. 16, robot 10 has radius r and is navigating through passage 594 between walls 596, 598. Passage 594 has a width of 2w. The avoidance distance r$_{avoid}$ is the distance by which an object is avoided and is computed according to the formula $$r_{avoid} = w - r \quad (4)$$

as shown in step 600, FIG. 15A. A maximum avoid distance "max avoid" is set when r$_{avoid}$ exceeds max avoid, steps 602, 604, respectively, to prevent robot 10 from deviating excessively from its path during obstacle avoidance. Further, a minimum clearance around objects can be specified, such as a wide avoider clearance, e.g. eight inches, or a narrow avoider, e.g. three inches.

Loop 606 thresholds the range data within the avoidance viewing angle such that for each range element r$_i$, step 608, the threshold set element t$_i$ is set to zero when r$_i$ is less than or equal to r$_{avoid}$, and t$_i$ is set to one when r$_i$ is greater than r$_{avoid}$, steps 610, 612, respectively.

Figure 17:
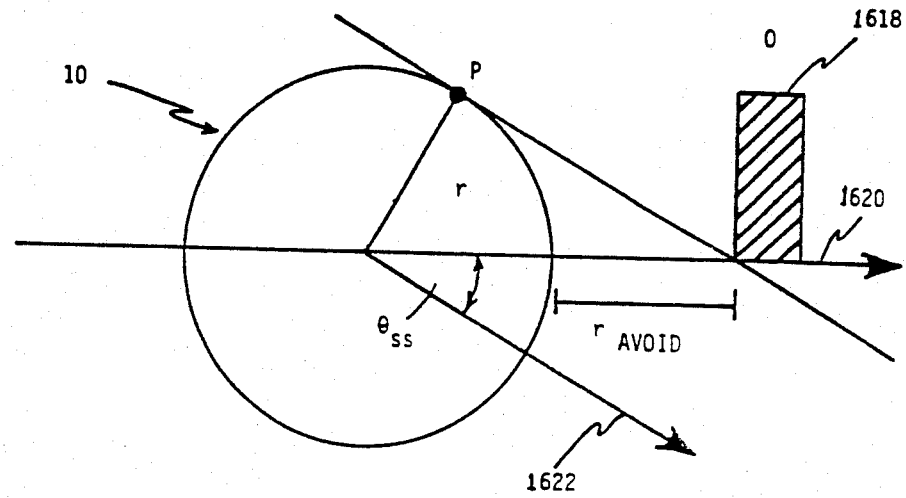
FIG. 17 is a schematic top plan view of the computation of side swipe angle around an object.

After the last range element r$_i$ is thresholded, that is, set to one or zero, step 614, the side-swipe angle theta$_{ss}$ is computed, step 616. As shown in FIG. 17, side-swipe angle theta$_{ss}$ is the minimum angle which robot 10 must turn such that point P will miss obstacle 618. In other words, robot 10 must alter heading 620 to at least heading 622 to avoid collision. The side-swipe angle is computed according to the formula $$\theta_{ss} = -\tan^{-1}\left(\frac{r}{r + r_{avoid}}\right) \quad (5)$$

The side-swipe angle is utilized, step 616, FIG. 15A, to compute the number of sectors by which the robot must avoid an object. In other words, neighboring sectors of a blocked sector must be set to zero. The zero-neighbor factor is computed by dividing the side-swipe angle theta$_{ss}$ by the beam width theta$_{bw}$, step 618, and rounding upwards to a whole integer. As stated above, the beam width theta$_{bw}$ of the ultrasound transducers of robot 10 is 15°.

A clear set is constructed in loop 620 by examining each thresholded range element t$_i$ and when it equals zero, step 622, its neighbors are zeroed such that the resulting clear set elements C$_i$ within Z sensor sectors of a blocked sector are set to zero, step 624. When the last thresholded range element t$_i$ has been processed, step 626, the sensor facing the direction of travel is computed in steps 628, 630. The sensor zero path angle theta$_{sz}$ is the angle from the path heading to sensor zero and is determined by subtracting the body angle theta$_b$ from the path angle theta$_p$. The integer number of the sensor facing the direction of travel, sensor S$_d$, is determined according to the formula $$S_d = \left(\theta_{SZ} - \frac{\theta_{bw}}{2}\right)/\theta_{bw} \tag{6}$$

as shown in step 630.

Since direction sensor $S_d$ is blocked, the nearest open sensor which, when the robot heads in that direction, will enable the robot to clear the obstacle, is determined by hunting successively clockwise to counterclockwise and back again from direction sensor $S_d$ to find the clear sensor $S_c$, step 632. The clear sensor $S_c$ is described as the non-zero element in the clear set nearest to the direction sensor $S_d$ in clear set $C_i$. This can be determined according to the formula $$i = \sigma_k(k+1)/2 + (1-\sigma_k)(n-k/2) \text{ modulo } n \tag{7}$$

where i is the index of a sensor relative to the forward-facing sensor, n is the number of active sensors, k is a counter constant, and $\sigma_k$ is equal to zero when k is even and equal to one when k is odd. Thus, equation (7) successively generates the elements 0, 1, n−1, 2, n−2, 3, ..., by which elements on either side of the desired sensor direction are alternately examined. The first non-zero clear set member is selected as the clear sensor.

Before the turn angle is calculated, the head direction angle $\theta_d$ is calculated by subtracting the sensor zero angle $\theta_{sz}$ from the head-path angle $\theta_m$, step 634. The index number of clear sensor $S_c$ is converted into degrees by multiplying it by beam width $\theta_{bw}$, from which is subtracted head direction angle $\theta_d$, step 636, to obtain $\theta_{turn}$, step 636.

The velocity is determined within the velocity field of view 577, 579, FIG. 14, by determining the minimum range $r_{min}$ within the forward-facing field of view, that is, around head direction angle $\theta_d$, step 638. Minimum range $r_{min}$ is utilized in loop 640 to determine the drive velocity $V_d$ by dividing the minimum detected range $r_{min}$ by the maximum avoidance range $R_{max}$ and multiplying it by the patrol velocity, step 642. Thus, the patrol velocity is maintained, steps 644, 646, until $R_{min}$ drops below $R_{max}$.

The turn value $\theta_{turn}$ and drive velocity $V_d$ are provided to arbiter 524, step 648. Operation then returns to step 590, where the calculations are repeated. Obstacle avoider system 528 thereby provides new commands which are accepted by motor controller 330 during execution of turns and during changes in velocity to provide smoother changes.

Figure 18:
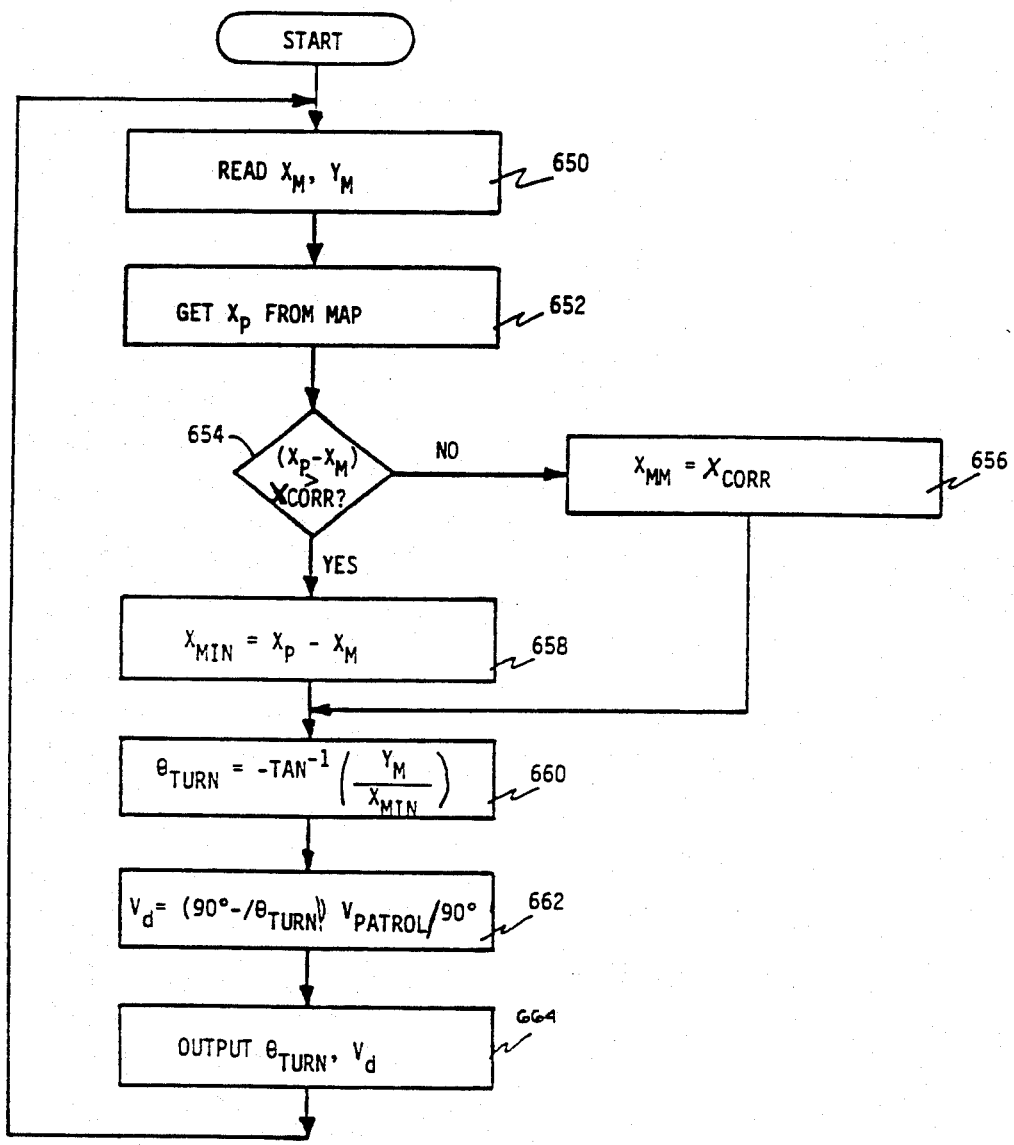
FIG. 18 is a flow chart of the path follower system of FIG. 12A.

Once the robot has avoided the obstacle, it returns to the path utilizing path follower 526, whose operation is depicted in FIG. 18. The present distances $X_m$, $Y_m$, are read from blackboard 410, step 650. The path distance $X_p$ is obtained from map 402 in step 652 and is compared to the distance actually travelled, $X_m$, to ensure that the correction distance $X_{corr}$ will not bring the robot beyond the destination node. The correction distance $X_{corr}$ is described above in relation to FIG. 14. From step 654, FIG. 18, the minimum elapsed distance along the X axis is set to correction distance $X_{corr}$, step 656, unless the robot is close to the node as defined in step 658. The turn angle $\theta_{turn}$ is computed according to the formula $$\theta_{turn} = -\tan^{-1}\left(\frac{Y_M}{X_{min}}\right) \tag{8}$$

as shown in step 660.

The travel velocity is inversely proportional to the magnitude of turn angle $\theta_{turn}$ as shown in step 662. The drive velocity and turn angle are then provided to arbiter 524, step 664, and operation returns to step 650. As shown in FIG. 12B, the output of beacon tracking system 522 is granted priority over the output of path follower 526 so that the robot resumes tracking the beacon, if present, once it is back on the path.

Figure 19:
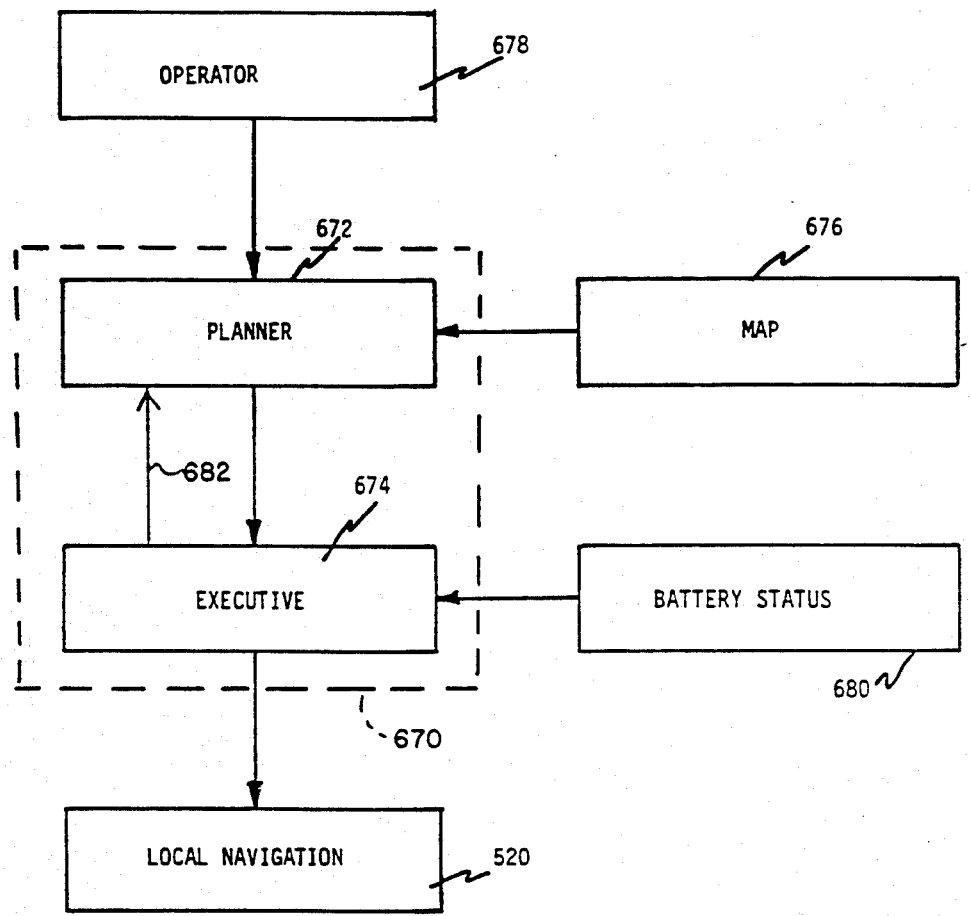
FIG. 19 is a schematic block diagram of the interrelation between the map, global navigation and local navigation.

The hierarchy of operational commands for robot 10 are shown in FIG. 19. Global navigation system 670 includes planner 672 and executive 674. Planner 672 is responsive to map 676, which contains the expected position estimation data, described above in relation to FIGS. 7A–7C, and other data such as the path type. For instance, a path can be designated as a avoidance path where objects are known to be present, a dead-reckoning path where no beacon is present, or a beacon tracking path where a navigation beacon is provided. The path can also be identified as a docking path which returns the robot to a recharge station, or as an intrusion detection path where intrusion detection is to be performed. Other information can be specified such as the patrol velocity or whether a narrow or wide avoidance clearance is required.

Operator 678 represents a guard or other personnel which provide commands to planner 672 such as the start node, the goal list, or a command to go to a particular node. Operator 678 can command the robot to resume patrol or to return to the charge station.

Planner 672 prepares a path list comprising the consecutive nodes to visit between each goal node and provides this list to executive 674. Executive 674 identifies the path direction and destination node when a current node is occupied, at which point local navigation 520 operates until the destination node is reached. Local navigation 520 relies upon the blackboard for current status information.

The travel of the robot is interrupted by battery status 680, which monitors voltage to determine when the batteries have discharged below a predetermined amount. Recharge current is monitored while the robot is docked to determine when the batteries are sufficiently charged.

Executive 674 notifies planner 672 on line 682 when the path list is complete or when battery status 680 indicates that the batteries have discharged below a certain level. Planner 672 then calculates the return path to the nearest charge station.

Figure 20:
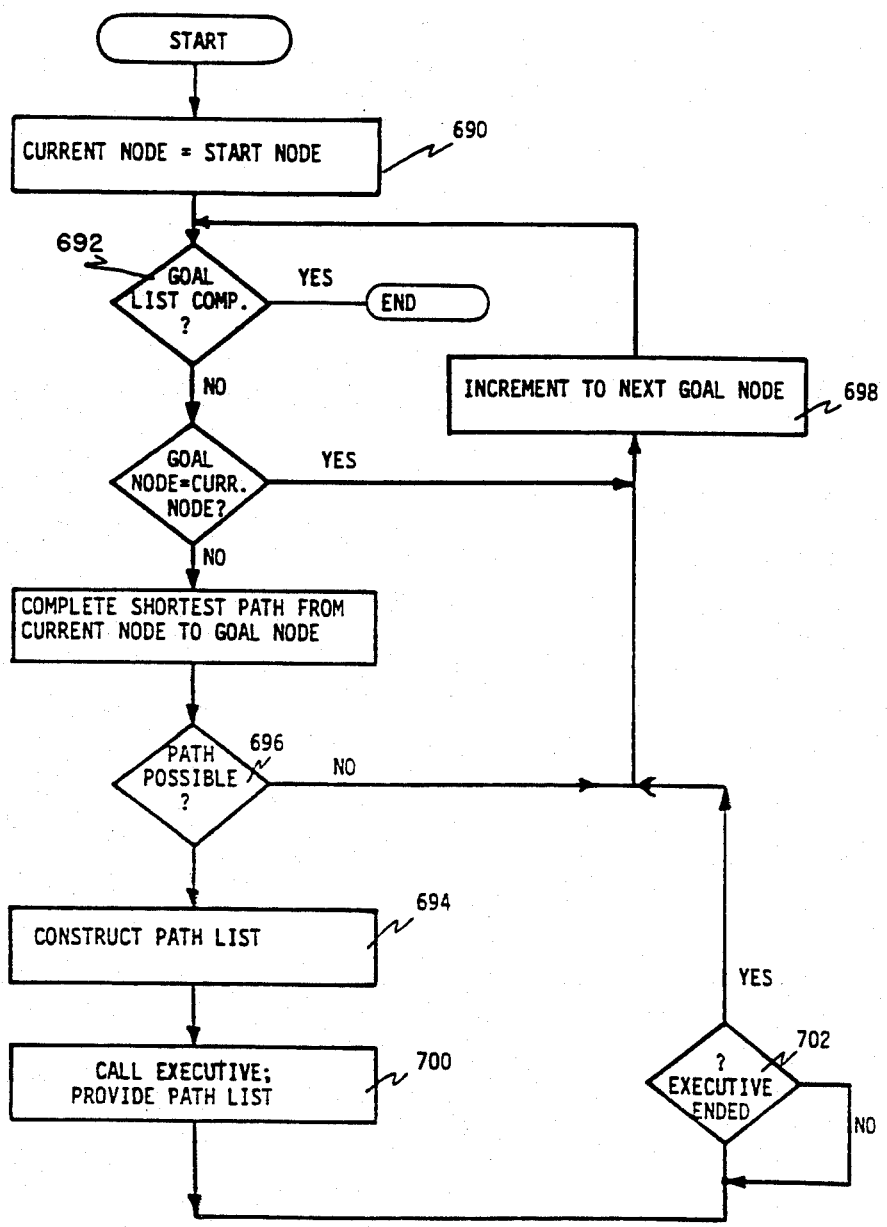
FIG. 20 is a flow chart of the planner of FIG. 19.

The operation of planner 672 is shown in FIG. 20. The current node is set to the start node, step 690, and loop 692 computes the shortest path from the current node to the goal node for each node in the goal list. The shortest path is computed using Djikstra's algorithm, such as described in Aho, Hopcroft and Ullman, *Data Structures and Algorithms* (1983), page 205. The path list for those nodes is thereby constructed, step 694, unless the path is not possible, step 696, in which case the next goal node is requested, step 698, and an alternative destination planned.

For each path list, the executive 674 is summoned, step 700, and is provided with the path list. When the executive has completed that path list, step 702, the next goal node is requested, step 698.

Figure 21:
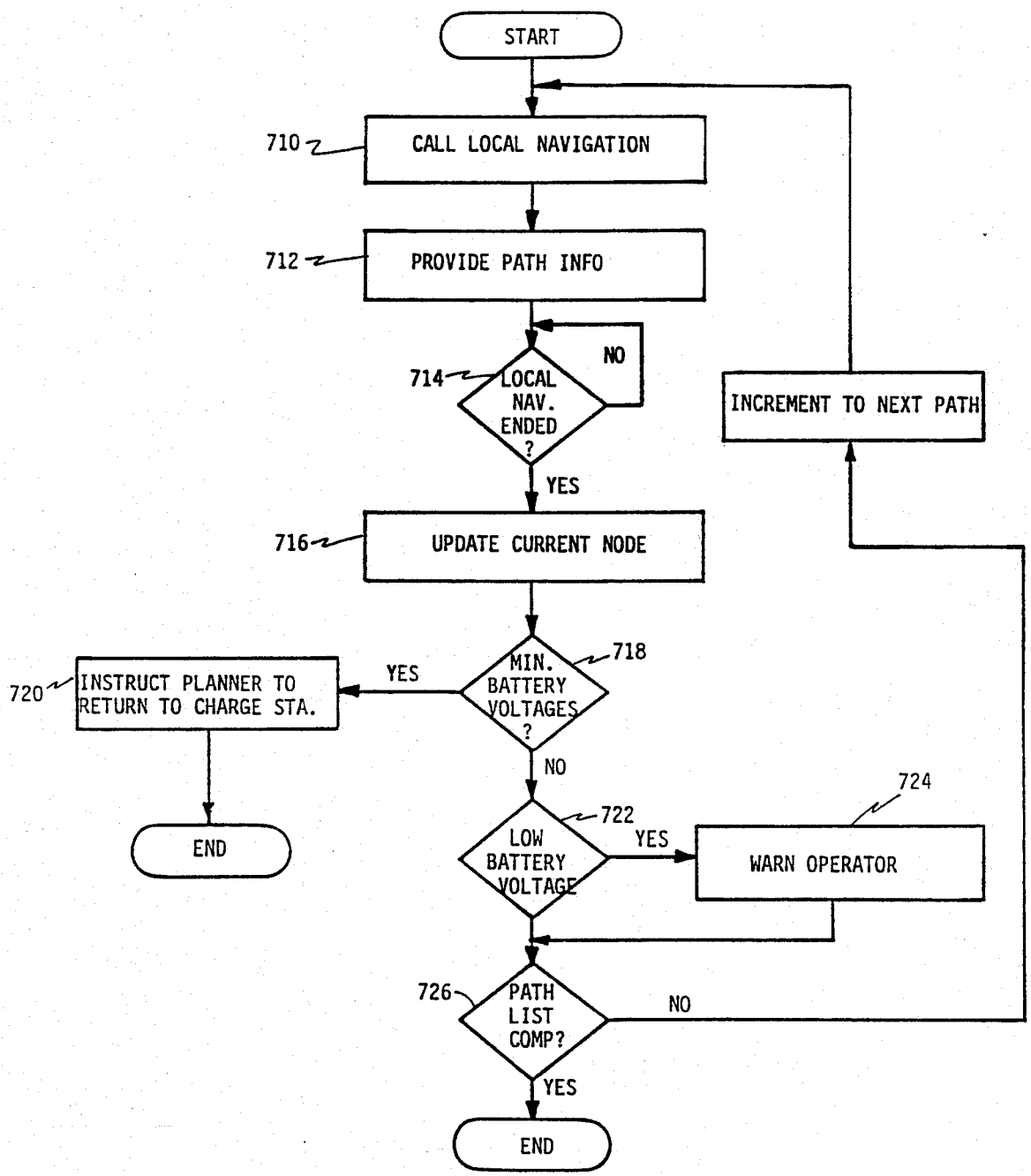
FIG. 21 is a flow chart of the executive of FIG. 19.

The operation of executive 674 is shown in FIG. 21. Local navigation 520 is summoned, step 710, and the path information is provided to it, step 712. Once local navigation has ended, step 714, and the destination node becomes the current node, the current node is updated, step 716, to identify it as the former destination node.

Two low battery 82 conditions are examined. When the battery voltage is at a minimum, step 718, the executive instructs the planner while at the node to return the robot to the nearest charge station, step 720. If the battery voltage is merely low, step 722, the operator is warned, step 724, and the robot resumes patrol. Executive 674 proceeds through the path list, step 726, until it is completed.

Map 676 can be generated by an operator who escorts the robot from node to node in a premises to be patrolled. The operator directs the robot to the node, a beacon is placed at the next node, and the robot is informed of the code for that distant beacon. The robot then scans, finds the beacon, and proceeds toward the beacon. If a beacon is not placed at the next node, the operator again directs the robot where to travel. The robot when at the next node records such information as the vertical angle to the beacon theta$_{VA}$, the distance to a wall $R_{HA}$, and the path distance $X_p$ is set to the actual distance travelled, $X_m$. The node may be named by the operator so that he can designate it as a goal node in the future. The operator places another beacon at the next node, and the process is continued until the robot has mapped its area of patrol.

In summary, the robot finds each node by operator designation or by beacons previously placed at the node. The robot then defines nodes by noting the angle and distance to and from the beacon, by uniquely identifying the beacon, or by other landmarks including passive beacons such as reflectors and bar codes. The robot can also define a node in terms of grid-based or segment-based geometric modeling.

Figure 22:
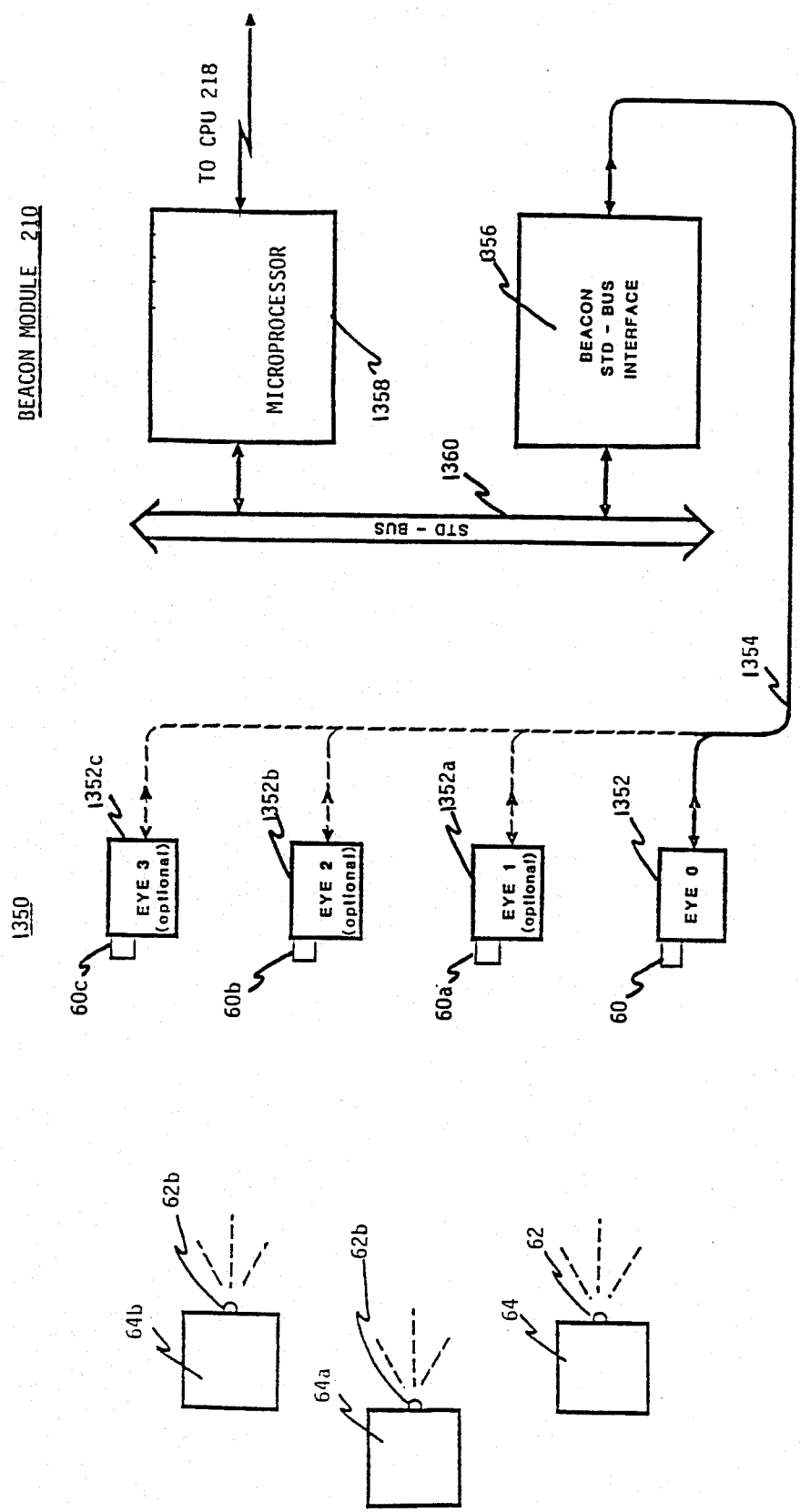
FIG. 22 is a block diagram of position locating including beacon sensors and the beacon electronic module.

Position locating system 1350, FIG. 22, includes one or more beacon transmitters 64, 64a, 64b, each having an infrared source 62, 62a, 62b. Also included is an infrared sensor 60 sensitive to the infrared radiation emitted by source 62, and associated with sensor 60 is an eye circuit 1352 whose output is provided on bus 1354. Bus 1354 interconnects with beacon STD-bus interface 1356 in beacon module 210. Interface 1356 communicates with microprocessor 1358 over STD bus 1360. Microprocessor 1358 may be a Z80 and it communicates directly with CPU 218, which may be a 68000.

Figure 25:
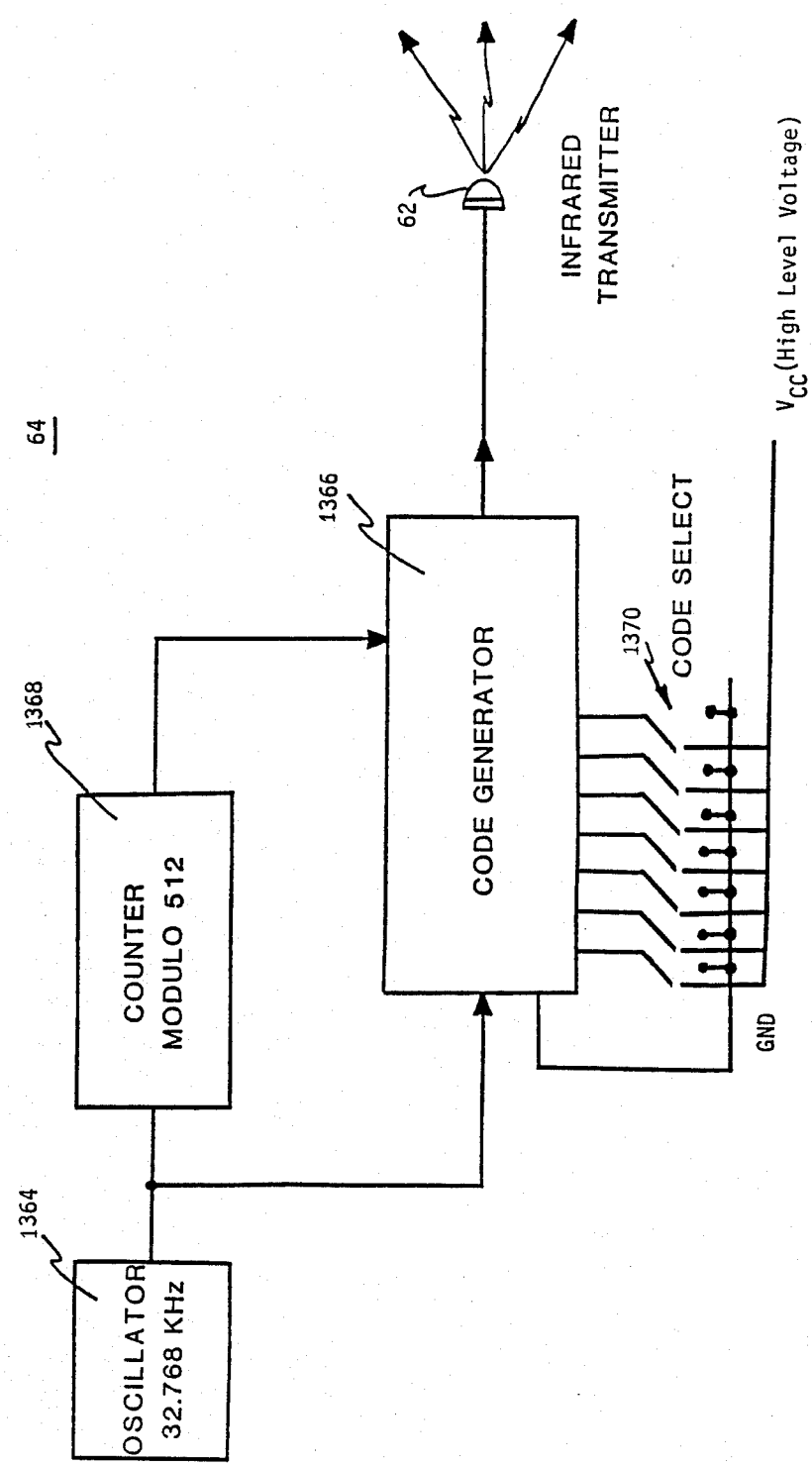
FIG. 25 is a more detailed block diagram of a beacon shown in FIG. 22.

Beacon transmitter 64 provides an optical burst 1362 of coded signals every 15.6 milliseconds, FIG. 23. Each burst, as shown in greater detail in FIG. 24, has a total burst time of 244 microseconds which defines an eight-bit word, each bit being 30.5 microseconds wide. The first bit is a start bit; the next seven bits are code bits and represent 128 different possible codes. Each code can uniquely identify a single beacon, so that with this simple arrangement one hundred twenty-eight different beacons can be uniquely identified; that is, when the infrared source is seen that is considered a logic one. When the infrared source, which may be a light-emitting diode or LED, is off, then the signal is low and is considered a logic zero. The signals shown in FIGS. 23 and 24 are generated in beacon transmitter 64 by an oscillator 1364, FIG. 25, which runs continuously at 32.768 KHz. Its output is delivered directly to a register in code generator 1366. Its output is also delivered to a counter 1368, modulo 512, which divides the 32.768 KHz signal to provide the time period shown in FIGS. 23 and 24. That is, with every 64th pulse (or every 15.6 ms) a burst occurs of eight bits. Eight bits are set to one or zero to produce the unique code for a particular beacon by the setting of the code select keys 1370. When one of the keys 1370 is toggled to ground, the associated stage of the register in 1366 is grounded, thereby placing a logic one in that bit position. Switches that are left toggled to high-level voltage produce a logic zero in the associated stage. The patterns of ones and zeros modulate the infrared radiation produced by LED 62 so that a coded signal is provided which uniquely defines the particular beacon.

Figure 26:
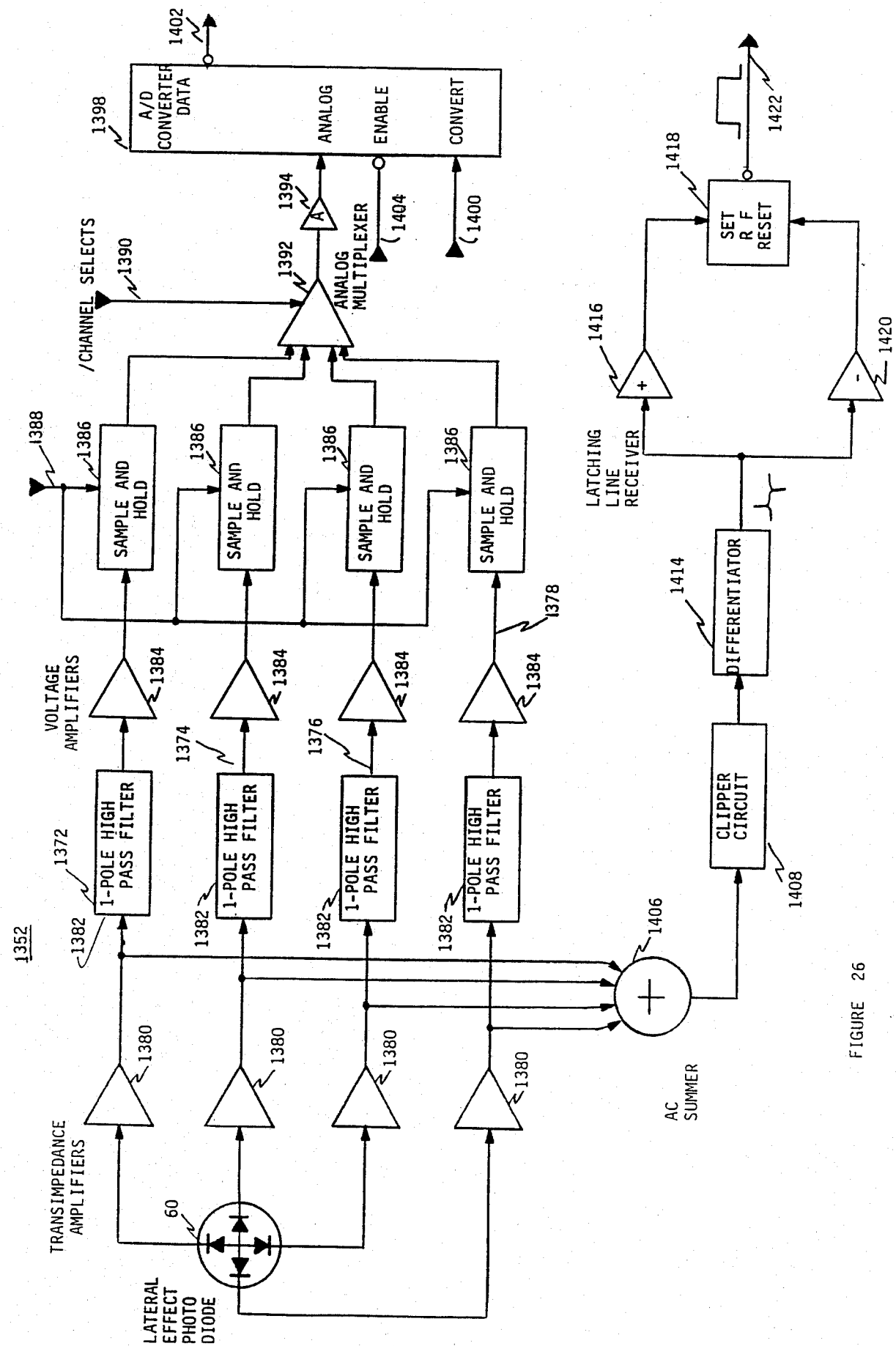
FIG. 26 is a more detailed block diagram of an eye shown in FIG. 22.

Sensor 60 in eye circuit 1352, FIG. 26, is a multisector sensor such as a dual-axis lateral effect photodiode. It provides four separate outputs, each indicative of the infrared radiation incident on its particular sector. By analyzing the relative values of the radiation falling on the different sectors, a determination can be made as to the angle of the sensor to the emitting beacon. Each of the four sector outputs from photodiode 60 is fed to a different channel 1372, 1374, 1376, 1378. Each channel includes an amplifier 1380, high-pass filters 1382, voltage amplifiers 1384, and sample and hold circuits 1386. High-pass filters 1382 pass the coded signal from beacon 64 but block 60-cycle and 120-cycle signals introduced by ambient light conditions; periodically on command from microprocessor 1358 a signal on sample and hold line 1388 causes sample and hold circuits 1386 to sample and hold the signal in each channel. Those signals are then multiplexed by analog multiplexer 1392 as directed by a command from microprocessor 1358 on line 1390. The signal from each channel is fed directly to the gain control of amplifier 1394. Finally, the output from each channel is fed to A/D converter 1398, where it stops unless a control signal on line 1400 from microprocessor 1358 requests the angle data signal on line 1402. Microprocessor 1358 also provides a select and enable signal on line 1404 to A/D converter 1398 to indicate the particular eye circuit 1352, 1352a, 1352b or 1352c which is currently being interrogated.

Simultaneously with this, one or more of the outputs from photodiode 60 after passing through amplifiers 1380 are combined in an AC summer 1406 in order to maximize the signal which will be used to detect the identifying code. From summer circuit 1406 the signal is passed to clipper circuit 1408, which limits the output independent of the input amplitude. At this point the signal is constituted by one or more coded pulses riding on an envelope of sixty or one hundred twenty cycle noise. Differentiator circuit 1414 is therefore used to detect only the transitions of the pulses; thus, for every positive-going transition a positive spike appears at the output of differentiator 1414 and for every negative-going transition a negative spike occurs at the output of differentiator 1414. The positive-going spikes pass through amplifier 1416 and set flip-flop 1418 to define the beginning of a pulse. Negative-going spikes passing through amplifier 1420 reset flip-flop 1418 and define the end of the pulse. In this way the pulses and the received coded signal are reconstituted one at a time to construct the code data signal on line 1422. The output of flip-flop 1418 may again be switched to indicate which one of the eye circuits 1352, 1352a, 1352b or 1352c is currently being monitored.

Figure 27:
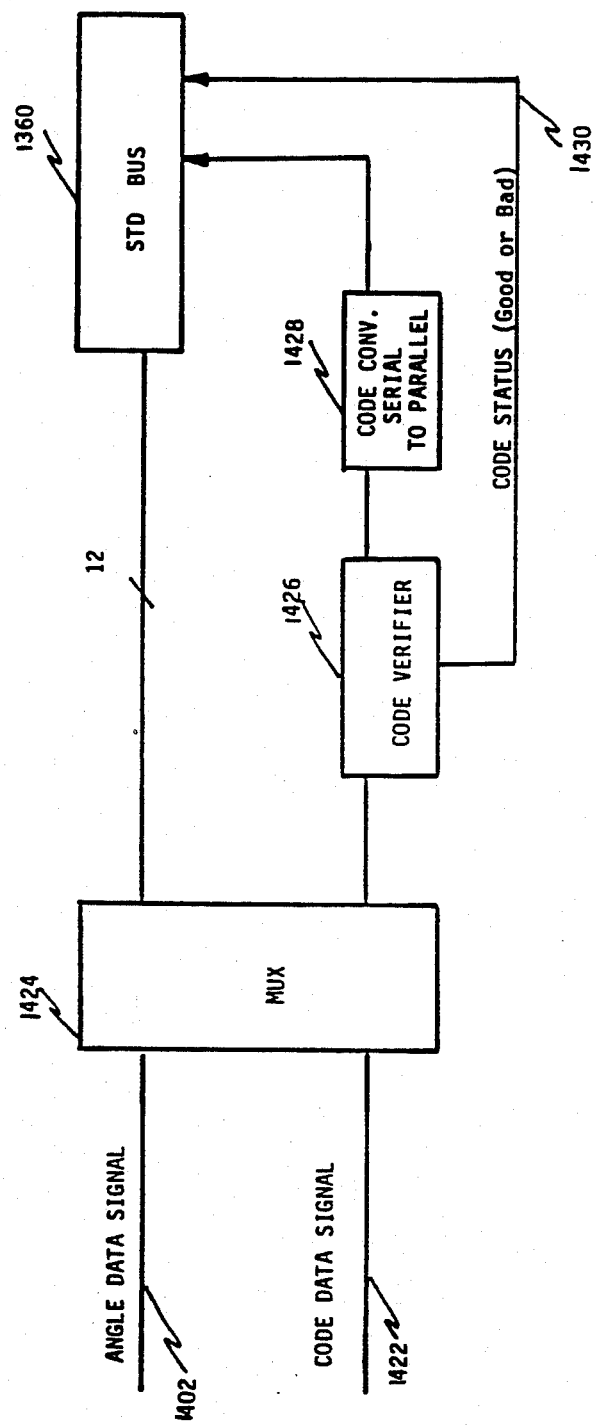
FIG. 27 is a more detailed block diagram of the beacon STD-bus interface of FIG. 22.

The angle data signal on line 1402, FIG. 27, is fed directly through MUX 1424 in beacon STD-bus interface 1356 to STD-bus 1360. The code data signal is fed from MUX 1424 to code verifier circuit 1426. After it is verified it is submitted to a converter 1428 where it is changed from a serial signal to a parallel signal and then provided to STD-bus 1360. Code verifier circuit 1426 may utilize any of a number of techniques for verifying the authenticity of an incoming code. For example, the incoming signal may be sampled at fixed times following a start pulse when pulse transitions would normally be expected in a valid signal. If the transitions occur within narrow windows at the expected times, they are treated as valid code; otherwise they are rejected. The code status is provided on line 1430 to STD-bus 1360.

Figure 28A:
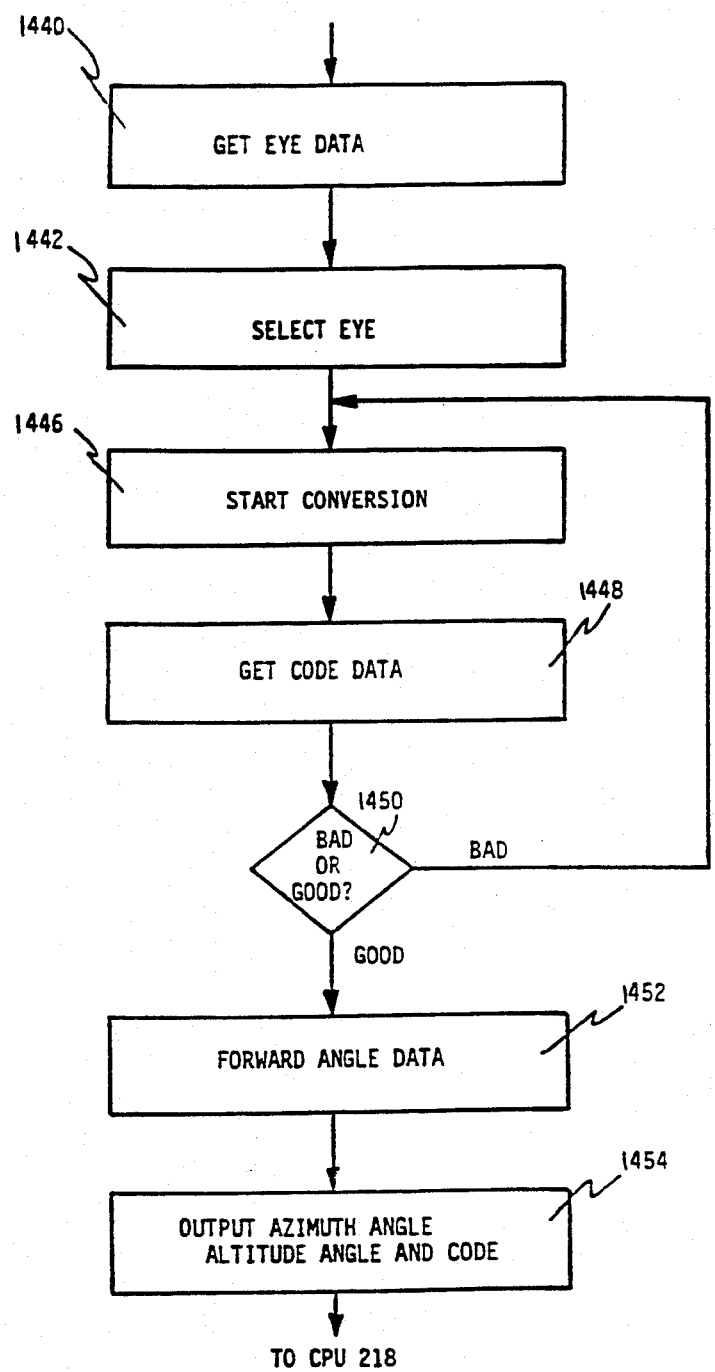
FIGS. 28A and 28B are flow charts of the software utilized in the microprocessor of FIG. 22.
Figure 28B:
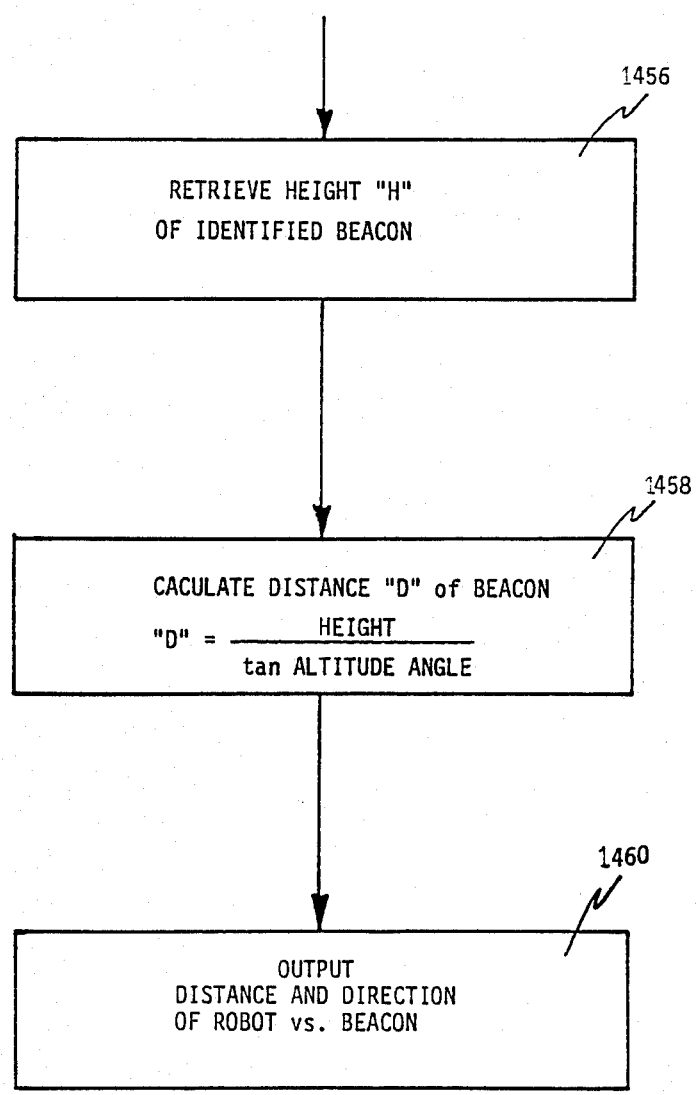

Under software control, FIGS. 28A and 28B, operation may begin with a signal from CPU 218 in step 1440 with the command "Get Eye Data". When microprocessor 1358 receives that signal it selects a particular eye in step 1442. The A/D converter is then commanded to start the conversion in step 1446 and the code data is obtained on line 1422 in step 1448. In step 1450, if the code data is bad the cycle starts again with the beginning of a new conversion in step 1446. If the code is good then the angle information is used and the next step 1452 provides the azimuth angle and the altitude angle and the code in step 1454 to microprocessor 1358. Here the angle data is converted to the azimuth angle and the altitude angle and combined with the code and directed to CPU 218. The azimuth angle needs no further processing. The altitude angle and code are delivered to CPU 218, which then retrieves the height H of the identified beacon in step 1456; height H can h=unique for that beacon, or all beacons can be placed at the same height. That height is used to calculate the distance D to the beacon by dividing the height by triangulation, e.g. the tangent of the altitude angle in step 1458. Then the distance and direction of the robot versus the beacon is output in step 1460.

Figure 29:
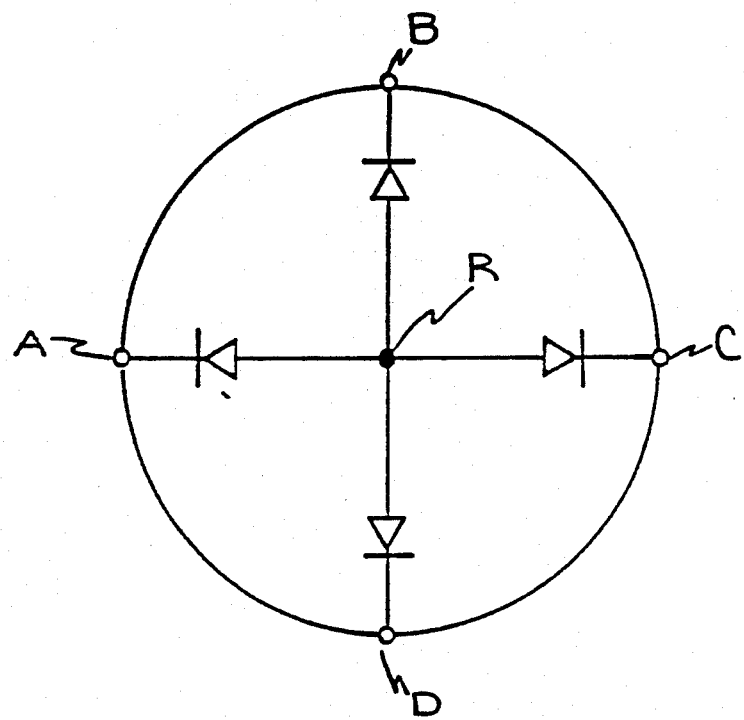
FIG. 29 is a schematic of the photodiode of FIG. 26.

The calculation in step 1454, FIG. 28A, of the azimuth angle and the altitude angle from the angle data signal is accomplished by determining the X position and the Y position from the dual axis lateral effect photodiode of FIG. 26 shown in more detail in FIG. 29. The X position is calculated according to the expression:

$$X \text{ position} = \frac{A - C}{A + C} \quad (9)$$

and the Y position by the expression:

$$Y \text{ position} = \frac{B - D}{B + D} \quad (10)$$

The division by A+C and B+D respectively normalizes the signal to reduce its dependence on the incident light level. The angles are those determined by the expression:

$$\text{Altitude Angle} = \arctan\left(\frac{B - D}{B + D} \times k\right) \quad (11)$$

$$\text{Azimuthal Angle} = \arctan\left(\frac{A - C}{A + C} \times k\right) \quad (12)$$

where K is a constant dependent on the size of the detector and focal length of the light gathering lens if one is used:

$$K = \frac{\frac{1}{2}D}{F_1} \quad (13)$$

where D is the diameter of the detector and $F_1$ is the focal length of the lens.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A beacon navigation system for a vehicle, comprsising:
   a plurality of navigation beacons distributed about a premises through which the vehicle is to navigate;
   detector means for sensing a beacon and for determining an observed azimuthal angle between the beacon and the vehicle;
   means for defining an expected azimuthal angle between that beacon and the vehicle; and
   means responsive to said detector means and said means for defining for determining the difference between said observed angle and said expected angle to represent the deviation of the vehicle from a designated path.

2. The beacon navigation system of claim 1 in which said detector means includes means for identifying the azimuthal angle between the beacon and the direction of travel of the vehicle.

3. The beacon navigation system of claim 1 in which said means for defining includes means for providing a known offset distance of said beacon from the designated path, and said means for defining produces said expected angle as a function of said offset distance.

4. The beacon navigation system of claim 3 in which said means for providing includes means for generating an azimuthal offset angle of the beacon from the path as a function of the known offset distance of the beacon from the path and the difference between the expected path distance and the actual distance traveled by the vehicle along the path.

5. The beacon navigation system of claim 4 in which said means for determining includes means for combining said ovserved angle and said offset angle to represent the angular deviation of the vehicle from the path.

6. The beacon navigation system of claim 5 further including means, responsive to said means for combining, for turning the vehicle by said angular deviation.

7. The beacon navigation system of claim 4 in which said means for defining further includes means for supplying the expected path distance and the known beacon offset distance.

8. The beacon navigation system of claim 7 in which said means for supplying includes memory means for storing the expected path distance and the known beacon offset distance.

9. The beacon navigation system of claim 4 in which said means for defining further includes means for measuring the actual distance travelled by the vehicle along the axis of the path.

10. The beacon navigation system of claim 1 in which each beacon includes means for emitting detectable energy.

11. The beacon navigation system of claim 10 in which said detector means includes:
   a multisector sensor for sensing a signal emitted by the beacon; and
   means responsive to said sensor sectors for generating an angle data signal representative of the observed angle from said sensor to said beacon in at least the azimuthal dimension.

12. The beacon navigation system of claim 11 in which said sensor is a lateral effect photodiode.

13. The beacon navigation system of claim 11 in which said detector means further includes means, responsive to said observed azimuthal angle, for calculating the direction from the sensor to the beacon.

14. The beacon navigation system of claim 11 in which each said beacon includes means for producing said energy in a coded signal which uniquely identifies that beacon.

15. The beacon navigation system of claim 14 in which said detector means includes:
   a multisector sensor for sensing a signal emitted by the beacon;
   means, responsive to said sensor, for generating a code data signal representative of said coded beacon signal; and
   means responsive to said sensor sectors for generating an angle data signal representative of the observed angle from said sensor to said beacon in at least the azimuthal dimension.

16. A beacon navigation system for a vehicle utilizing one or more navigation becons distributed about a premises through which the vehicle is to navigate, comprising:
   detector means for sensing a beacon and for determining the observed azimuthal angle between the beacon and the vehicle;
   means for defining an expected azimuthal angle between that beacon and the vehicle; and
   means responsive to said detector means and said means for defining for determining the difference between said observed angle and said expected angle to represent the deviation of the vehicle from a designated path.

17. The beacon navigation system of claim 16 in which said means for defining includes:
   means for supplying the expected path distance and the known offset distance of the beacon from the path;
   means for measuring the actual distance traveled by the vehicle along the path; and
   means for generating an azimuthal offset angle of the beacon form the path as a function of the known offset distance and the difference between the expected path distance and the actual distance traveled.

18. The beacon navigation system of claim 17 in which said means for determining includes means for combining said observed angle and said offset angle to represent the angular deviation of the vehicle from the path.

19. The beacon navigation system of claim 18 further including means, responsive to said means for combining, for turning the vehicle by said angular deviation.

* * * * *